United States Patent

Nakano et al.

[11] Patent Number: 5,913,918
[45] Date of Patent: Jun. 22, 1999

[54] AUTOMOTIVE NAVIGATION APPARATUS AND RECORDING MEDIUM STORING PROGRAM THEREFOR

[75] Inventors: Nobuyuki Nakano, Katano; Akihiro Suzuki, Itami; Yasuhiro Ihara, Osaka; Hisaya Fukuda, Sakai, all of Japan

[73] Assignee: Matsushita Electric Industrial Co., Ltd., Osaka-fu, Japan

[21] Appl. No.: 08/665,496

[22] Filed: Jun. 12, 1996

[30] Foreign Application Priority Data

Jun. 13, 1995 [JP] Japan .................................. 7-146535
Sep. 11, 1995 [JP] Japan .................................. 7-232910

[51] Int. Cl.$^6$ .................................................. G01C 21/00
[52] U.S. Cl. ........................ 701/208; 701/211; 701/213; 340/995
[58] Field of Search .................................. 701/208, 209, 701/211, 213, 212, 201; 340/995; 342/357, 457; 345/419, 434, 430

[56] References Cited

U.S. PATENT DOCUMENTS

| | | | |
|---|---|---|---|
| 4,888,712 | 12/1989 | Barkans et al. | 364/522 |
| 5,276,785 | 1/1994 | Mackinlay et al. | 395/127 |
| 5,566,073 | 10/1996 | Margolin | 364/449 |
| 5,574,649 | 11/1996 | Levy | 364/449 |
| 5,583,494 | 12/1996 | Mizutani et al. | 340/995 |
| 5,793,310 | 8/1998 | Watanabe et al. | 340/995 |

FOREIGN PATENT DOCUMENTS

| | | |
|---|---|---|
| 0 378 271 | 7/1990 | European Pat. Off. . |
| 0 406 946 | 1/1991 | European Pat. Off. . |
| 0 534 533 | 3/1993 | European Pat. Off. . |
| 0 579 451 | 1/1994 | European Pat. Off. . |
| 0 660 290 | 6/1995 | European Pat. Off. . |
| 3-26917 | 2/1991 | Japan . |
| 5-203457 | 8/1993 | Japan . |

OTHER PUBLICATIONS

Spoerri, "Novel Route Guidance Displays", IEEE–IEE Vehicle Navigation & Information Systems Conference, Ottawa, Oct. 12–15, 1993, pp. 419–422.

*Primary Examiner*—Michael Zanelli
*Attorney, Agent, or Firm*—Wenderoth, Lind & Ponack, L.L.P.

[57] ABSTRACT

A map searching unit reads from a map storing unit map data adjacent to the current position of a vehicle calculated by a position calculator or map data having a range of a map to be displayed specified by an input unit. A processing unit performs a perspective transformation of eye point and focus point coordinates inputted from the input unit, maps the map data on the transformed coordinates, performs clipping, and then makes an output unit display the map after mapping.

25 Claims, 19 Drawing Sheets

LAYER 1 — WIDE AREA

LAYER 2

LAYER 3 — DETAIL

FIG. 8(a)
MARK COORDINATE TABLE
| LATITUDE | LONGITUDE | CLASSIFICATION NUMBER |
|---|---|---|
| 12 | 2523 | 2 |
| 864 | 1742 | 1 |
| 1098 | 790 | 3 |
| | | |
| | | |
| 3549 | 927 | 1 |
FIG. 8(b)
MARK SHAPE TABLE
| CLASSIFICATION NUMBER | MARK SHAPE |
|---|---|
| 1 |  |
| 2 | 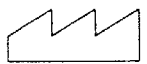 |
| | |
| N |  |
FIG. 8(c)
3-D MARK SHAPE TABLE
| CLASSIFICATION NUMBER | 3-D MARK SHAPE |
|---|---|
| 1 |  |
| 2 | 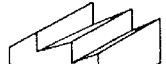 |
| | |
| N |  |

ALTITUDE VALUE

DESTINATION POINT   STARTING POINT eye point

AUTOMOTIVE NAVIGATION APPARATUS AND RECORDING MEDIUM STORING PROGRAM THEREFOR

BACKGROUND OF THE INVENTION

1. Field of the Invention

The present invention relates to an automotive navigation apparatus, and more specifically, to an automotive navigation apparatus which displays a map adjacent to the current position of a vehicle and provides a driver with a route from the current position to a destination, and a recording medium storing a program therefor.

2. Description of the Background Art

A conventional automotive navigation apparatus generally two-dimensionally displays a map on a screen. In the conventional automotive navigation apparatus which displays the map on the screen, however, there is a disadvantage in that the driver can acquire only two-dimensional information and cannot grasp three-dimensional information such as difference of altitude of a road caused by terrain roughness. Furthermore, there is a limit to the size of a monitor loaded in a vehicle and disadvantageously, only a limited range of the map adjacent to the current position can be displayed.

Therefore, various navigation apparatus are suggested which can three-dimensionally display a map. For example, Japanese Patent Laying-Open No. 3-26917 discloses that the forward road from the current position of a mobile unit on a road map is displayed by scenography. Furthermore, Japanese Patent Laying-Open No. 5-203457 discloses that scenery from an arbitrary position on a map is displayed as a three-dimensional image by using shape data and altitude data of mountains and buildings linked to the map.

As disclosed in Japanese Patent Laying-Open No. 3-26917, however, in the automotive navigation apparatus which displays a map using scenography, while the road map displayed on a screen and the real road shape can advantageously easily correspond each other, there is the disadvantage as in the conventional automotive navigation apparatus for two-dimensional display.

As in Japanese Patent Laying-Open No. 5-203457, in the automotive navigation apparatus which three-dimensionally displays a map by accumulating contour lines in the altitude direction using the shape data and altitude data of mountains and buildings, a data structure is complicated and massive amounts of data are required for smooth display of a terrain.

Furthermore, in the conventional automotive navigation apparatus, since character information is displayed in a level manner on a map where a road network is complicated, visual recognition is disadvantageously impaired.

Furthermore, the conventional automotive navigation apparatuses having a function for acquiring a route in an arbitrary section, a method for setting a destination and a method for selecting a road are disadvantageously complicated.

SUMMARY OF THE INVENTION

Therefore, it is an object of the present invention to provide an automotive navigation apparatus capable of displaying a map with a small calculation load so that the forward road can be widely viewed, and a recording medium operable for storing a program therefor.

It is another object of the present invention to provide sign information on a displayed map in a form which an operator can easily recognize.

It is still another object of the present invention to provide an automotive navigation apparatus capable of, on a three-dimensionally displayed map, easily setting a route from a starting point to a destination point and plainly providing the operator with the set route.

It is a further object of the present invention to provide an automotive navigation apparatus capable of three-dimensionally displaying a terrain with an easy processing, and a recording medium storing a program therefor.

The present invention includes the following characteristics to attain the above objects.

A first aspect of the present invention is directed to an automotive navigation apparatus, which includes a map storing portion operable for storing map data, a map acquiring portion operable for acquiring the map data stored in the map storing portion, and an eye point inputting portion operable for inputting eye point coordinates and focus point coordinates for viewing the map data acquired at the map acquiring portion. The apparatus also includes a coordinate transforming portion operable for performing a three-dimensional coordinate transformation of a specific point on the map data acquired at the map acquiring portion on the basis of the eye point coordinates and the focus point coordinates inputted at the eye point inputting portion, a mapping portion operable for deforming the map data acquired at the map acquiring portion so as to map the map data onto the coordinates transformed at the coordinate transforming portion, a clipping portion operable for clipping the map data mapped at the mapping portion, and an output portion operable for outputting a map area clipped at the clipping portion.

As mentioned above, in the first aspect where coordinates of the specific point (for example, four vertexes) of the map data in use for display are three-dimensionally transformed and the map is mapped on the result, map display can be performed with a small calculation load so that the forward road can be widely viewed.

In the first aspect, when a name billboard of a place, an intersection, etc., or a mark of a building etc., is displayed on a three-dimensionally displayed map, a shift may be corrected between a map background after the three-dimensional coordinate transformation and reference point coordinates after the coordinate transformation. Thus, the mark can always be displayed at an appropriate position. In this case, the size of the mark may be changed according to the distance from a focus point position. Thus, a three-dimensional effect of the displayed map can be emphasized. Furthermore, according to the relative positional relation between the focus point position of the map and the reference position coordinates of a prescribed mark, a shape pattern of the mark to be displayed may be changed. Thus, for example, the name billboards of a place, an intersection, etc., on the three-dimensionally displayed map can be distributed to the right and left sides of the focus point position so as to be displayed so as not to hide roads adjacent to the center of a screen.

Furthermore, in the first aspect, the three-dimensional shape mark included in the map data may be subjected to the three-dimensional coordinate transformation to be displayed. Thus, a map display with a deeper dimensional effect can be attained. Furthermore, in the first aspect, on the basis of received traffic information, the traffic information indicating a degree of congestion, traffic control, etc., may be three-dimensionally displayed. Thus, a traffic information display with high visual recognition can be attained.

In the first aspect, a preferred embodiment further includes an altitude value storing portion operable for storing altitude value data, an altitude value acquiring portion operable for acquiring the altitude value data corresponding to the map data acquired at the map acquiring portion from the altitude value storing portion, and a map dividing portion operable for dividing the map data acquired at the map acquiring portion into fine blocks. The preferred embodiment also includes the coordinate transforming portion operable for performing the three-dimensional coordinate transformation using the altitude value data acquired at the altitude value acquiring portion, and the mapping portion operable for deforming the fine blocks obtained by division at the map dividing portion on the coordinates transformed at the coordinate transforming portion, and a face hiding processing portion operable for performing a face hiding processing on the fine blocks mapped at the mapping portion.

With the above structure, the terrain can be three-dimensionally displayed in an easy processing operation using only a plane map and altitude values.

The face hiding processing portion preferably writes over each of the fine blocks obtained by division at the map dividing portion while scanning in a prescribed direction. Thus, the face hiding processing can be readily performed at high speed without sorting all faces to be displayed. In this situation, the face hiding processing portion may scan to output the map data subjected to the coordinate transformation from the most distant point to the second most distant point with respect to an eye point inputted at the eye point inputting portion among four vertexes of the map data acquired at the map acquiring portion which are subjected to an eye point transformation at the coordinate transforming portion.

In the preferred embodiment, a route setting portion may be provided for obtaining a route between arbitrary points, and the altitude values on the route set at the route setting portion may be displayed as a cross-sectional view. Thus, ruggedness change of the route can be provided for the driver in advance. Therefore, the driver can easily select an easy route to run.

In the preferred embodiment, the mapping portion preferably recognizes a tunnel section on the map data acquired at the map acquiring portion, and deletes the tunnel section for mapping. Therefore, especially in a mountainous region, a display having more three-dimensional effect can be realized.

In the preferred embodiment, the current position of the vehicle may be superposed on the three-dimensional terrain map where a position of a GPS satellite is taken as the eye point coordinates. Thus, the receiving status of radio waves from the GPS satellite can be visually provided for the driver.

In the preferred embodiment, the altitude value data may be switched according to layers of the map to be displayed. Thus, for example, it is possible to perform map display mainly for representation capable of viewing forward in a detailed map, and also to perform map display mainly for three-dimensional terrain representation in a wide-area map.

A second aspect of the present invention is directed to a navigation apparatus which is loaded in a vehicle, guides and instructs a route of the vehicle, which includes a map storing portion operable for storing map data, a position calculating portion operable for calculating a current position of the vehicle; a scroll instructing portion operable for instructing scroll of an output map; a reference position deciding portion operable for deciding a reference position of the output map using the current position of the vehicle calculated by the position calculating portion or a position specified by the scroll instructing portion as a reference. The apparatus also includes an output range specifying portion operable for specifying an output range of the map, a mark generating portion operable for generating a current position mark and a current position indicating mark showing a positional relation of the current position mark with respect to the reference position on the basis of the current position of the vehicle calculated by the position calculating portion and the reference position of the output map decided by the reference position deciding portion, an output screen generating portion operable for reading a corresponding range of the map data from the map storing portion on the basis of the reference position of the output map decided by the reference position deciding portion and the output range of the map specified by the output range specifying portion, and generating an output screen together with the current position mark and the current position indicating mark generated by the mark generating portion, and an output portion operable for outputting the screen generated by the output generating portion.

According to the second aspect where the position of the current position mark with respect to the reference position is provided to a user by displaying the current position indicating mark during scrolling, the user can easily grasp the relation between the displayed map and the current position even if the current position mark is out of the display screen.

A third aspect of the present invention is directed to a navigation apparatus which is loaded in a vehicle, guides and instructs a route of the vehicle, which includes a map storing portion operable for storing map data, a position calculating portion operable for calculating a current position of the vehicle, a scroll instructing portion operable for instructing scroll of an output map, and a reference position deciding portion operable for deciding a reference position of the output map using the current position of the vehicle calculated by the position calculating portion as a reference. The apparatus also includes an output range specifying portion operable for specifying an output range of the map, a mark generating portion operable for generating a current position mark on the basis of the current position of the vehicle calculated by the position calculating portion, and a route searching portion operable for reading necessary map data from the map storing portion to calculate a route between two points. The apparatus also includes a moving picture guide screen generating portion operable for generating a moving picture guide screen for a route guide on the basis of the route calculated by the route searching portion, an output screen generating portion operable for reading a corresponding range of the map data from the map storing portion on the basis of the reference position of the output map decided by the reference position deciding portion and the output range of the map specified the output range specifying portion, and generating an output screen together with the current position mark generated by the mark generating portion and the moving picture guide screen generated by the moving picture guide screen generating portion, and an output portion operable for outputting the screen generated by the output generating portion.

According to the third aspect where the guide screen is displayed using a moving picture, right/left turn information at an intersection etc., can plainly be indicated.

A fourth aspect of the present invention is a recording medium storing a software program for executing a method which includes a first step for acquiring map data from a map data storing portion previously storing the map data, a second step for inputting eye point coordinates and focus point coordinates from which the map data is viewed acquired at the first step, and a third step for performing a three-dimensional coordinate transformation of a specific point on the map data acquired at the first step on the basis of the eye point coordinates and the focus point coordinates inputted at the second step. The method also includes a fourth step for deforming to map the map data acquired at the first step on the coordinates transformed at the third step, a fifth step for clipping the map data mapped at the four step, and a sixth step for outputting a map area clipped at the fifth step.

In the fourth aspect, a recording medium of a preferred embodiment stores a software program for executing a method which further includes a seventh step for acquiring altitude value data corresponding to the map data acquired at the first step from an altitude value storing portion, an eighth step for dividing the map data acquired at the first step into fine blocks, the third step performing the three-dimensional coordinate transformation using the altitude value data acquired at the seventh step, and the fourth step deforming to map the fine blocks obtained by division at the eighth step on coordinates transformed at the third step; and further includes a ninth step for performing a face hiding processing on the fine blocks mapped at the fourth step.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 8(a) to 8(c) are diagrams showing various tables for use in generating marks to be arranged on the map;

DESCRIPTION OF THE PREFERRED EMBODIMENTS

(1) First embodiment

Figure 1:
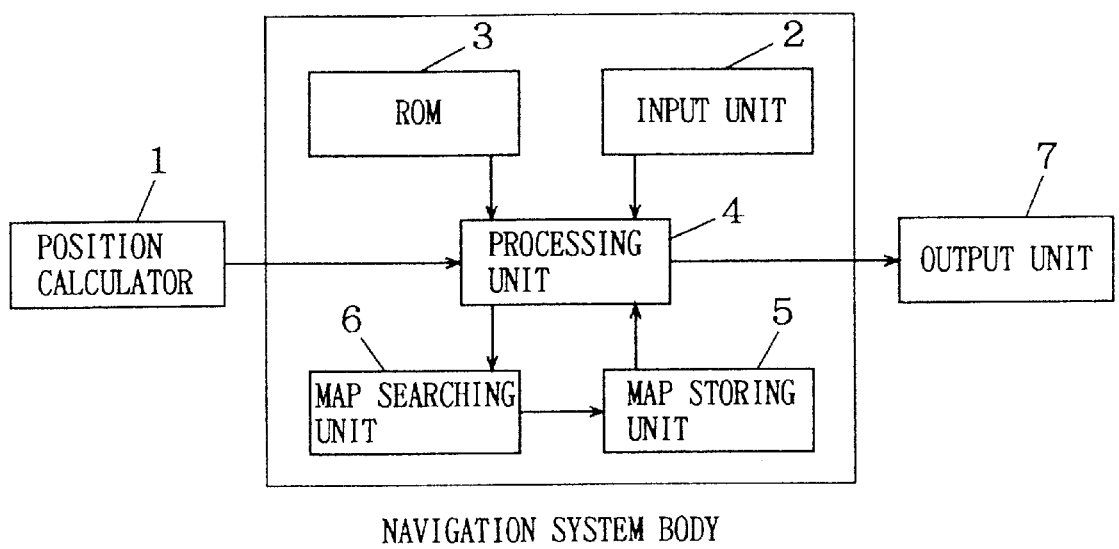
FIG. 1 is a block diagram showing the basic structure of an automotive navigation apparatus according to a first embodiment of the present invention.

FIG. 1 is a block diagram showing the structure of an automobile navigation apparatus according to a first embodiment of the present invention. In FIG. 1, the automobile navigation apparatus includes a position calculator 1, an input unit 2, ROM 3, a processing unit 4, a map storing unit 5, a map searching unit 6, and an output unit 7.

The position calculator 1 calculates the current position of a vehicle on a map. This is realized by various methods such as detecting distance traveled by the vehicle through a vehicle speed sensor, detecting a direction of travel of the vehicle through a gyroscopic sensor, obtaining a correspondence between a locus of travel of the vehicle and a road shape on the map, or detecting an absolute position on the earth by receiving radio waves from a GPS satellite, or by combination of these sensors. The input unit 2 is a unit for inputting information based on an operation by an operator and other external information to a navigation system body. The ROM 3 stores a program for controlling the entire system. Instead of the ROM 3, a rewritable recording medium such as a hard disk may be provided to store a program provided in a form of online or offline. The processing unit 4 controls the navigation system body according to the program stored in the ROM 3. The map searching unit 6 searches map data required for display or data processing. The map storing unit 5 is formed of a recording medium such as a CD-ROM which stores the map data, and its driving unit. The output unit 7 outputs the map data and processing results in the processing unit 4 to the operator.

The operation of the automotive navigation apparatus of the first embodiment as structured above is subsequently described. Each processing operation shown in the embodiment may be realized as software by using a computer, or may be realized by using dedicated hardware circuits having each function of the processing operations.

The embodiment is characterized in that coordinates of four vertexes of the map data to be used for display are subjected to a three-dimensional coordinate transformation and a map is mapped as a texture on the transformed coordinates, whereby a bird's eye view map display is performed so that the forward road can be widely viewed by processings with a small calculation load and various character symbol information is displayed on the map in a form where the operator can easily recognize the information.

Figure 3:
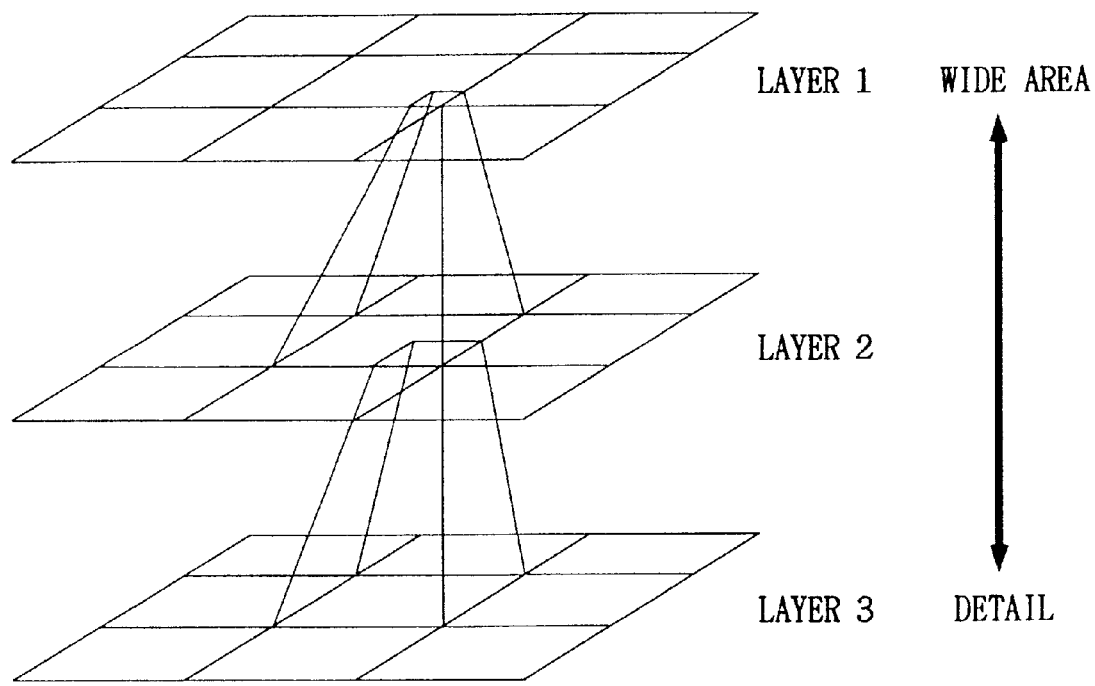
FIG. 3 is a diagram showing a layer structure of a map.

Referring to FIG. 3, the structure of the map data is subsequently described. Generally, the map is divided by a predetermined range as a unit, and is structured by a plurality of layers (scales) to vary the level of detail of the map according to a display range. Therefore, it is required to prepare a map including the center of display and a plurality of its peripheral maps in an appropriate scale to display an arbitrary range of the map centering on an arbitrary point. In the embodiment, a recorded range of each unit is constant in the map of the same layer.

Figure 2:
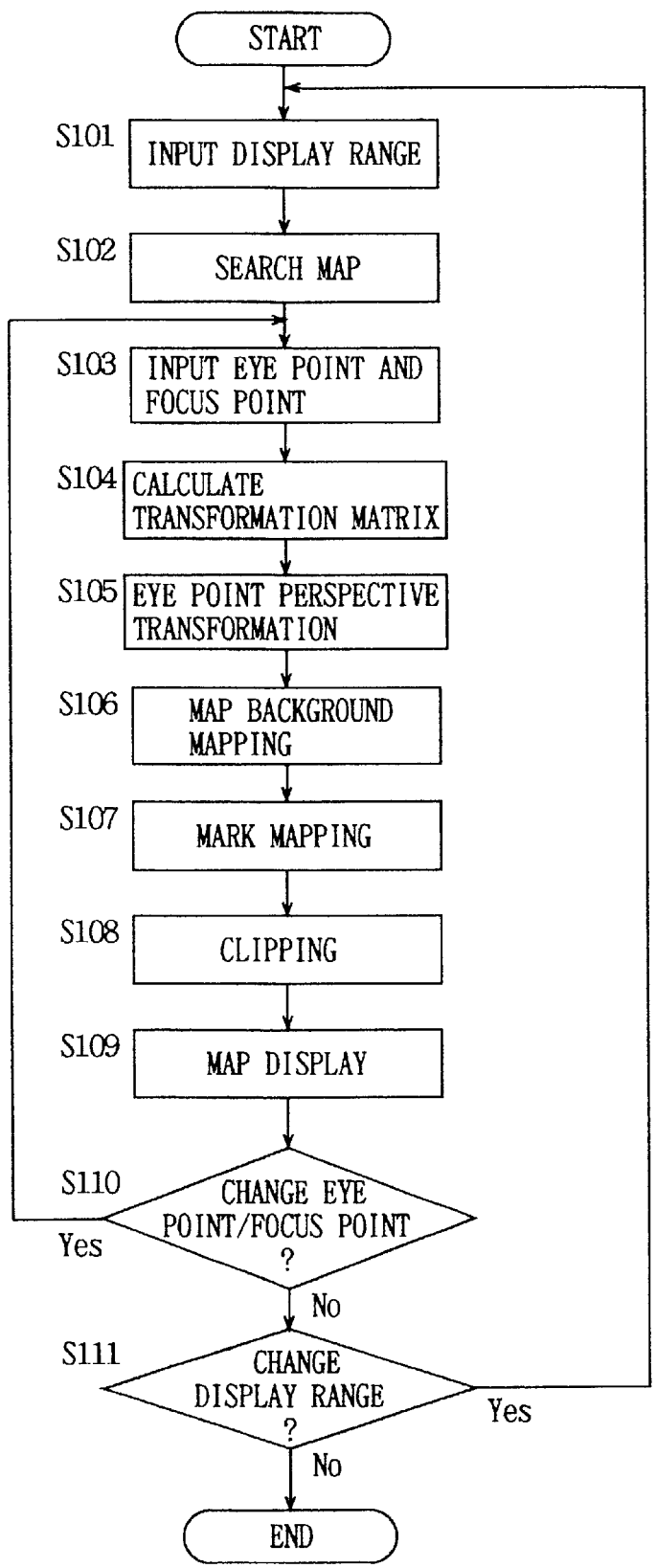
FIG. 2 is a flowchart showing the operation of the first embodiment of the present invention.

FIG. 2 is a flowchart describing a processing procedure in the first embodiment of the present invention. The content of the processing of the first embodiment is subsequently described according to the flowchart.

The processing unit 4 has as an input a range of the map to be displayed on the basis of an operation by the operator of the input unit 2 or the current point of the vehicle obtained by the position calculator 1 (step S101). The display range of the map may be decided by the center of display and a display scale, or may be specified by, for example, upper-left and lower-right coordinates and then a suitable display scale for the range may be decided. In either way, in step S101, the center coordinates of display and the display scale are decided.

Figure 4:
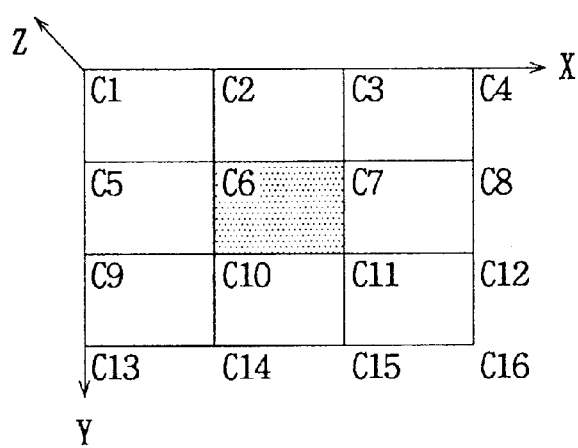
FIG. 4 a diagram showing the arrangement of a read map unit.

Next, the processing unit 4 searches the map including the center of display and the peripheral maps using the map searching unit 6 to read the corresponding maps from the map storing unit 5 (step S102). Although the number of peripheral maps to be prepared has no limit, a map unit including the center of display and eight adjacent map units are read in the present embodiment, and the nine map units are arranged on the X-Y plane of the XYZ coordinate system shown in FIG. 4. In FIG. 4, the center part diagonally shaded is the map unit including the center of display.

Next, in step S103, coordinates of an eye point where the map is viewed and a focus point are inputted. The focus point represents the center of display, which may be a position inputted by the operator through the input unit 2 or the current position of the vehicle obtained by the position calculator 1. The eye point is set above and behind the focus point. Therefore, since the focus point is on the map plane, its Z coordinate is 0. The eye point has a positive Z coordinate.

Next, the processing unit 4 calculates a transformation matrix of the eye point coordinates as a determinant of 3×3 matrix shown in the following equation (1) (step S104).

$$[x'', y'', z''] = [x - xv, y - yv, z - zv] \begin{bmatrix} \sin\theta & -\cos\theta\sin\phi & \cos\theta\cos\phi \\ -\sin\theta & -\sin\theta\sin\phi & \sin\theta\sin\phi \\ 0 & \cos\phi & \sin\phi \end{bmatrix} \quad (1)$$

In the equation (1), however, where the eye point is Pv(xv, yv, zv) and the focus point is Pf(xf, yf, zf), $\sin\theta = (yv - yf)/r$ $\cos\Phi = (xv - xf)/r$ $\sin\Phi = (zv - zf)/r1$ $\cos = r1/r$ $r = \sqrt{(r1^2 + (zv - zf)^2)}$ $r1 = \sqrt{((xv - xf)^2 + (yv - yf)^2)}.$ Next, the processing unit 4 calculates eye point coordinates [x", y", z"] of the four vertexes of each map unit using the equation (1), and also performs a perspective transformation using the following equation (2) (step S105).

$$[x', y'] = [(x''/z'')dist, (y''/z'')dist] \quad (2)$$

Figure 5:
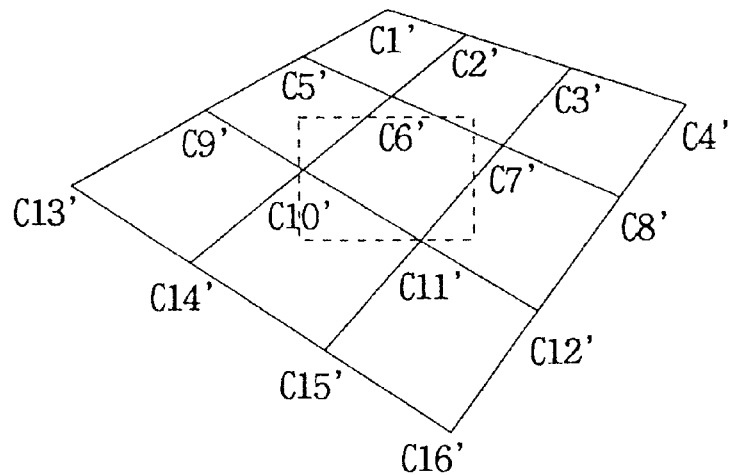
FIG. 5 is a diagram showing a result of subjecting the map unit in FIG. 4 to a perspective transformation.

In [x', y'] of the equation (2), the center of display is the origin of the coordinates. Furthermore, dist in the equation (2) is a parameter designating the depth from the eye point, which is set in the range of 300 to 1000 in the embodiment. In this way, an eye point perspective transformation is applied to the coordinates of four vertexes of each map unit as shown in C1 to C16 in FIG. 4 to obtain C1' to C16' as shown in FIG. 5.

In the navigation apparatus, not only a map background but also various character symbol information is required to be displayed. Examples of the character symbol information to be displayed are a balloon-shaped billboard representing a character string such as an intersection, a road, a name of a city, etc., and a mark representing a map symbol and a main building, etc. In the following description, the character symbol information to be displayed is generically called a mark.

The mark to be displayed on the map is generated using a mark coordinate table in FIG. 8(a) and a mark shape table in FIG. 8(b). The mark coordinate table provided for each map unit records coordinates (latitude and longitude) of the marks existing in the map range and classification numbers of the marks, and when the entire area of Japan is covered, its data size and the number of operation for creating the data are enormous. On the other hand, since the mark shape table which stores shape data of the mark to be displayed by each classification is common to all of the units and the amount of the data can be smaller than in the case that the shape data is stored by each unit, the mark shape table is generally prepared separately from the mark coordinate table. Moreover, the size and the number of operation for creating the mark shape table are generally much smaller than those of the mark coordinate table. Therefore, in step S105, a coordinate transformation is applied to the coordinate of the mark in the map of the mark to be displayed on the basis of the equations (1) and (2). Since the display position of the mark generally has coordinates having one of the four vertexes of each map as the origin, the mark can be displayed on the map background by adding the coordinates of each mark to the origin.

As the mark to be displayed on the map, not only a two-dimensional model but also a mark having a three-dimensional shape as shown in FIG. 8(c) may be allowed. In this case, in step S105, the coordinate transformation is applied to the four vertexes of each map unit and the display position of each mark, and at the same time, the three-dimensional shape of each map is obtained from a 3-D mark shape table as shown in FIG. 8(c), for example, and then the coordinate transformation is applied to each of the points constructing the mark shape. The 3-D mark shape table is created by transforming the shape of the two-dimensional mark shape table into three-dimensional data with automatic or manual operation.

The normal mark shape records a pattern of a dot string constructing the mark, and a 3-D mark shape records the number of dots constructing the mark and three-dimensional coordinates of each dot. In FIG. 8(c), however, images of the shapes themselves are shown for the sake of clarity.

Next, the processing unit 4 deforms each map unit according to the coordinates of the coordinate-transformed four vertexes (step S106). Any deforming method can be applied, such as linear interpolation. Nine map units are deformed to be mapped on grids in FIG. 5, whereby the effect can be obtained such that the eye point perspective transformation is virtually applied to the whole display content of the maps.

Next, the processing unit 4 maps marks such as a character string and a symbol on the map background mapped at step S106 (step S107). In this case, when each mark is displayed as it is according to the coordinates transformed at step S105, the display position of the mark and the object on the map background are shifted in position. This is because, as shown in steps S105 and S106, since the eye point perspective transformation is applied to only the coordinates of four vertexes of the map background and its internal area is deformed by a method such as linear interpolation, the coordinates of a road in the map and the like are slightly shifted from those precisely subjected to the three-dimensional coordinate transformation as getting closer to the center of the map unit. Therefore, the mark coordinates precisely subjected to the three-dimensional transformation at step S105 and the roads etc. of the map background deformed at step S106 are shifted in position, whereby, especially at the time of rotating the maps with movement of the eye point, the mark is disadvantageously shifted along an ellipse on the periphery of the original position.

In responding to the above problem, coordinate correction is performed according to the following equation (3) so that the display position of the mark is consistent with the object mapped on the map background.

$$\left. \begin{array}{l} dx = vrx \times \sin S \\ dy = vry \times \cos S \end{array} \right\} \quad (3)$$

Figure 6:
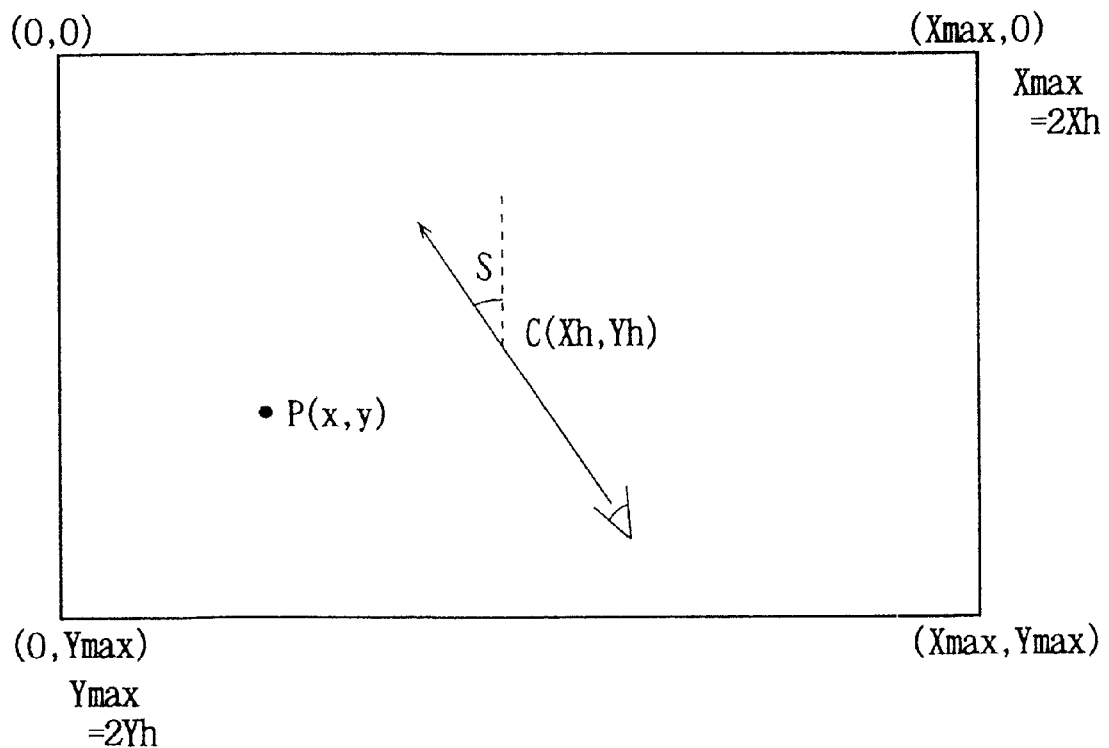
FIG. 6 is a diagram showing a position of a mark arranged on the map and a viewing direction.

FIG. 6 is a diagram showing a position of a mark P on the map unit and a viewing direction. In FIG. 6, Xmax and Ymax are maximum values of X coordinates and Y coordinates in the map unit, respectively, and C(Xh, Yh) is the center of the unit. In the equation (3), vrx and vry are obtained by subtracting absolute values of x-Xh and y-Yh from Xh and Yh, respectively, and then multiplying by a constant v (which is decided by a parse, for example, 0.12), and are integers.

The coordinate correction can be performed by adding dx and dy obtained by the equation (3) to x' and y' after the three-dimensional coordinate transformation, respectively.

In the present embodiment, a three-dimensional effect of the displayed map is emphasized by displaying the mark displayed as such with the size changed according to the distance from the focus point position. Since z" coordinate of the eye point coordinate transformation is a distance from the eye point, an enlargement rate E of the mark is calculated by, for example, the following equation (4).

$$E = (A/z'') + 1.0 \quad (4)$$

In the equation (4), A is a constant for adjusting the enlargement rate. Next, each mark is scaled up E times for display on the map.

Figure 7:
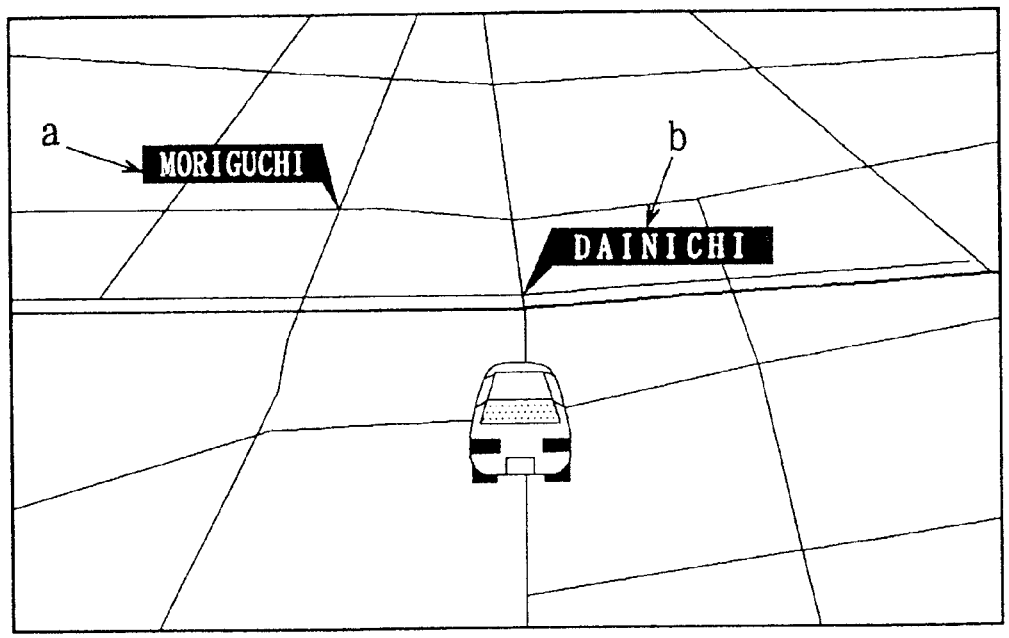
FIG. 7 is a diagram showing an example of arrangement of name billboards on the map.

When the mark is displayed on the three-dimensionally transformed map background, there is a possibility that visibility is prevented because the mark hides a road in the direction of travel. Therefore, in the present embodiment, the mark on the three-dimensionally displayed map is distributed to the right and left sides of the focus point position to prevent the road adjacent to the center of display from being hidden, so that the forward direction of travel on the display map can be looked through. The absolute value of y' coordinate after perspective coordinate transformation designates the distance in the right or left directions from the center of the display screen, and y' coordinate designates whether a sign is on the right or the left sides. In the present embodiment, a positive sign indicates the right side of the screen, and a negative sign indicates the left side of the screen. According to the sign, after the processing such as selecting right or left shape of the balloon such as a and b in FIG. 7 or shifting the eye point position to be coordinate-transformed in the right or left in the case of the three-dimensional mark, the mark is mapped on the map background.

When the current position of the vehicle calculated by the position calculator 1 exists on the read map data, the current position mark of the vehicle is mapped on the map ground.

Next, the processing unit 4 clips the display area with a broken line in FIG. 5 (step S108), to make the output unit 7 display the display area in the broken line in FIG. 5 (step S109). The map in an arbitrary position covering an arbitrary range can thus be three-dimensionally displayed.

Next, the processing unit 4 determines whether to change the eye point and focus point (step S110), and returns to step S103 to repeat the operation up to step S109 when the processing unit 4 determines to change.

Figure 27:
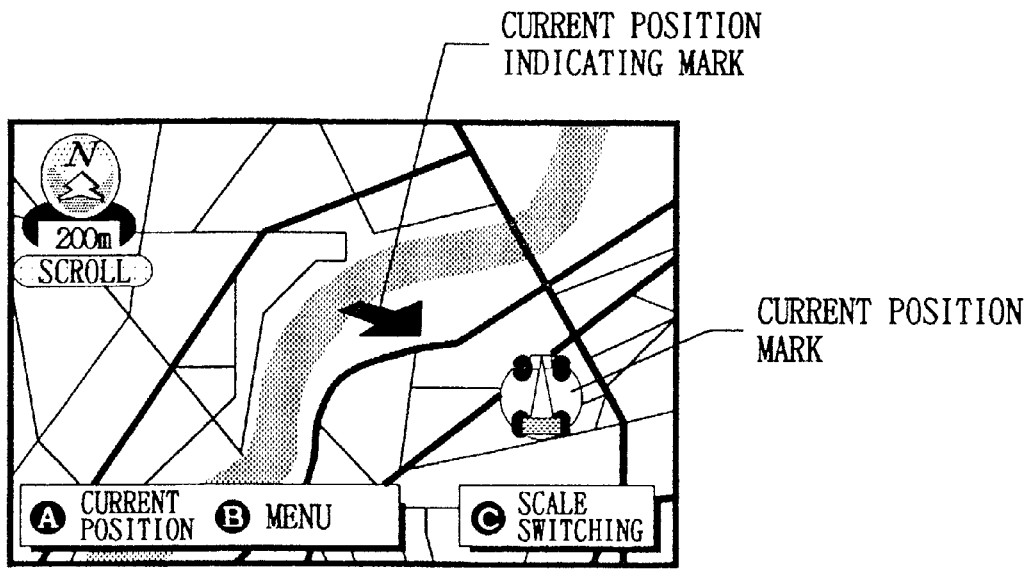
FIG. 27 is a diagram showing an example of a current position mark and a current position indicating mark.
Figure 28:
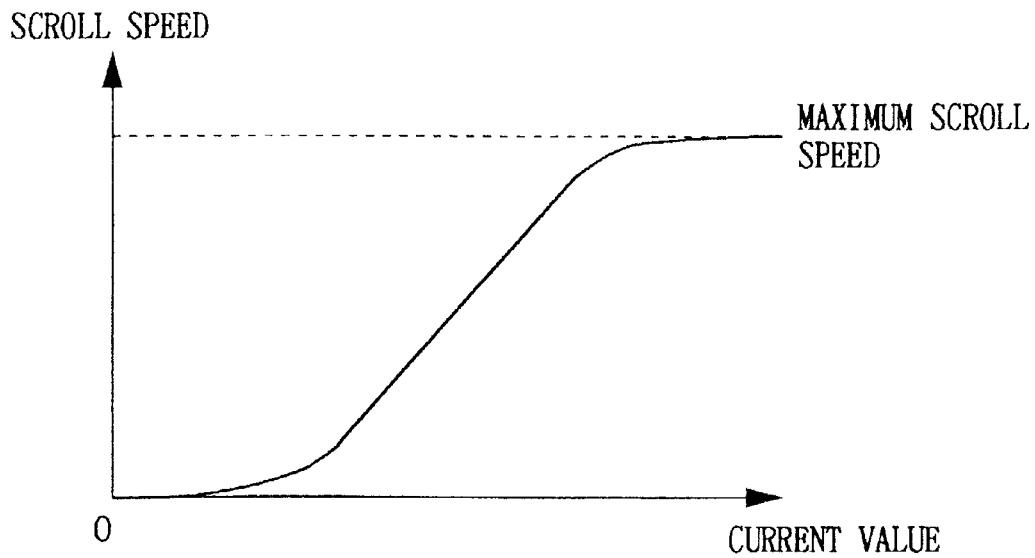
FIG. 28 is a diagram showing a relation between a scroll speed and a current value.

That the eye point or the focus point is to be changed is applied to a case where the current position of the vehicle is changed as the vehicle moves, or a case where the map is scrolled by the input operation by the operator through the input unit 2. In either case, the map is displayed centering on the focus point position. In the latter case, however, since the current position of the vehicle and the center of the screen are different, a current position indicating mark designating the direction of the current position of the vehicle is displayed at the center of the screen. An example of a current position mark and the current position indicating mark is shown in FIG. 27. The relation between the displayed map and the current position of the vehicle can thus be easily grasped even if the current position of the vehicle is out of the map display range.

Furthermore, the processing unit 4 determines whether to change the display range (step S111), and returns to step S101 to repeat the operation up to step S109 when the processing unit 4 determines to change.

As described above, three-dimensional map display can be achieved with less of a calculation load by subjecting only four vertexes of the map unit to the three-dimensional coordinate transformation and deforming to map the map on the transformed coordinates. Furthermore, setting the eye point above and behind the focus point allows the map in the direction of travel to be widely displayed.

By interpolating the coordinates of the character symbol information displayed on the three-dimensionally transformed map, the character symbol information can be displayed without incompatibility even at the map rotation.

The name of the place and the size of the mark on the three-dimensionally displayed map are changed according to the distance from the current position to advantageously be able to emphasize a three-dimensional effect of the map, and to increase the range at a glance for a far-off mark as well as to display a nearby mark in detail.

The billboard of the name of the place, the intersection, etc., and other marks are distributed to the right and left sides of the focus point position displayed, whereby the character symbol information can be provided for the operator without preventing visibility of the direction of travel on the displayed map.

Moreover, only a table describing mark shapes in a rather small size is created for three-dimensional display, whereby the three-dimensional mark can be displayed on the three-dimensionally displayed map to greatly enhance practicality of the displayed map.

In the first embodiment, while a two-dimensional or three-dimensional still picture is used as the mark to be displayed, a moving picture such as animation may be used.

Further, while z" which is a distance from the eye point after the eye point coordinate transformation is used at the time of calculating the enlargement rate, anything may be used as long as the same effect is brought. For example, using y' after the perspective transformation instead of z" can bring the same effect by changing constants. While the sign of y' coordinate after the perspective coordinate transformation for judging the right or left of each mark, anything may be used as long as the same effect is brought. For example, using the sign of y" after the eye point coordinate transformation instead of that of y' can bring the same effect.

While each point constructing each mark's shape is subjected to the coordinate transformation, only the display position of each mark may be subjected to the coordinate transformation and the three-dimensional shape data may be displayed without the transformation.

Figure 14:
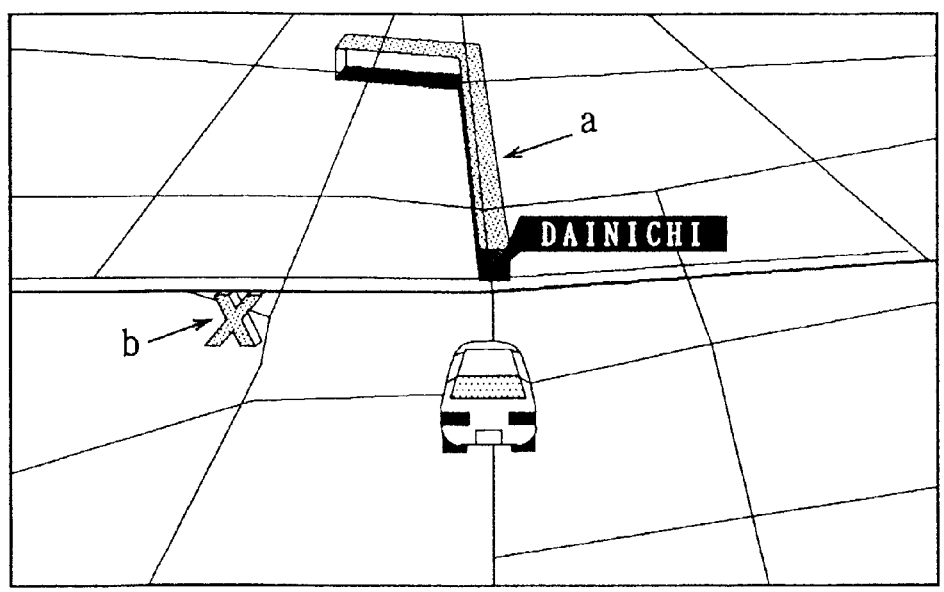
FIG. 14 is a diagram showing an example of a display of traffic information on the map.

A device capable of obtaining traffic information such as an FM multiplex receiver as the input unit 2 may be provided and the obtained traffic information may be superposingly displayed on the three-dimensionally transformed map. Specifically, the traffic information is obtained from the input unit 2, and coordinates of congestion information and traffic control information are matched to the coordinates of the displayed map so as to be superposingly displayed on the map. The matching can be performed by transforming the reference of the coordinates defined in the format of the traffic information into coordinate values in the map unit. Furthermore, since the congestion information is concomitant to the road, the road on which each congestion information depends is selected from the map for display. Although various methods can be taken depending on the format of the traffic information, the corresponding road can be generally specified from latitude and longitude information. Next, vector data of the specified road is subjected to the coordinate transformation together with the coordinates of four vertexes of the map unit. At this time, coordinate values of the starting and end points of each road vector are required to be corrected as well as the mark coordinates. In the present embodiment, after being provided with width, the congested road vector is displayed in a rather isolated manner for clear display of the congested road. Therefore, the coordinate transformation is performed after the z coordinate of each road vector is set to a predetermined value (for example, 20 m). On the other hand, since control information such as suspension of traffic is information depending on the points, the 3-D control information mark can be displayed in the same processing as in the case of the mark. A display example is shown in FIG. 14. In FIG. 14, "a" represents a congested section and "b" is the control information mark representing suspension of traffic. Thus, the congestion information and traffic control can be plainly displayed.

Furthermore, the input unit may be structured by combining a piezoelectric element so that an electric signal corresponding to the intensity of pushing a button is inputted to the input unit, and may be able to adjust a scroll speed according to the electric signal. Thus, the scroll speed can be finely adjusted according to the intensity of pushing the button and fine scroll can be easily performed.

(2) Second embodiment

Next, an automotive navigation apparatus according to a second embodiment of the present invention is subsequently described. The basic structure of the automotive navigation apparatus of the second embodiment is the same as that of the first embodiment in FIG. 1. That is, in the second embodiment, a program stored in the ROM 3 of FIG. 1 is different from the program in the first embodiment. Therefore, the second embodiment is subsequently described referring to FIG. 1.

The second embodiment is mainly characterized in that, on the three-dimensionally displayed map as described in the first embodiment, a route from a starting point to a destination can be easily set and the set route can be plainly provided for the operator.

FIGS. 9 to 13 are flowcharts describing processing procedures in the second embodiment of the present invention. The content of the processings of the second embodiment is subsequently described according to the flowcharts.

Figure 9:
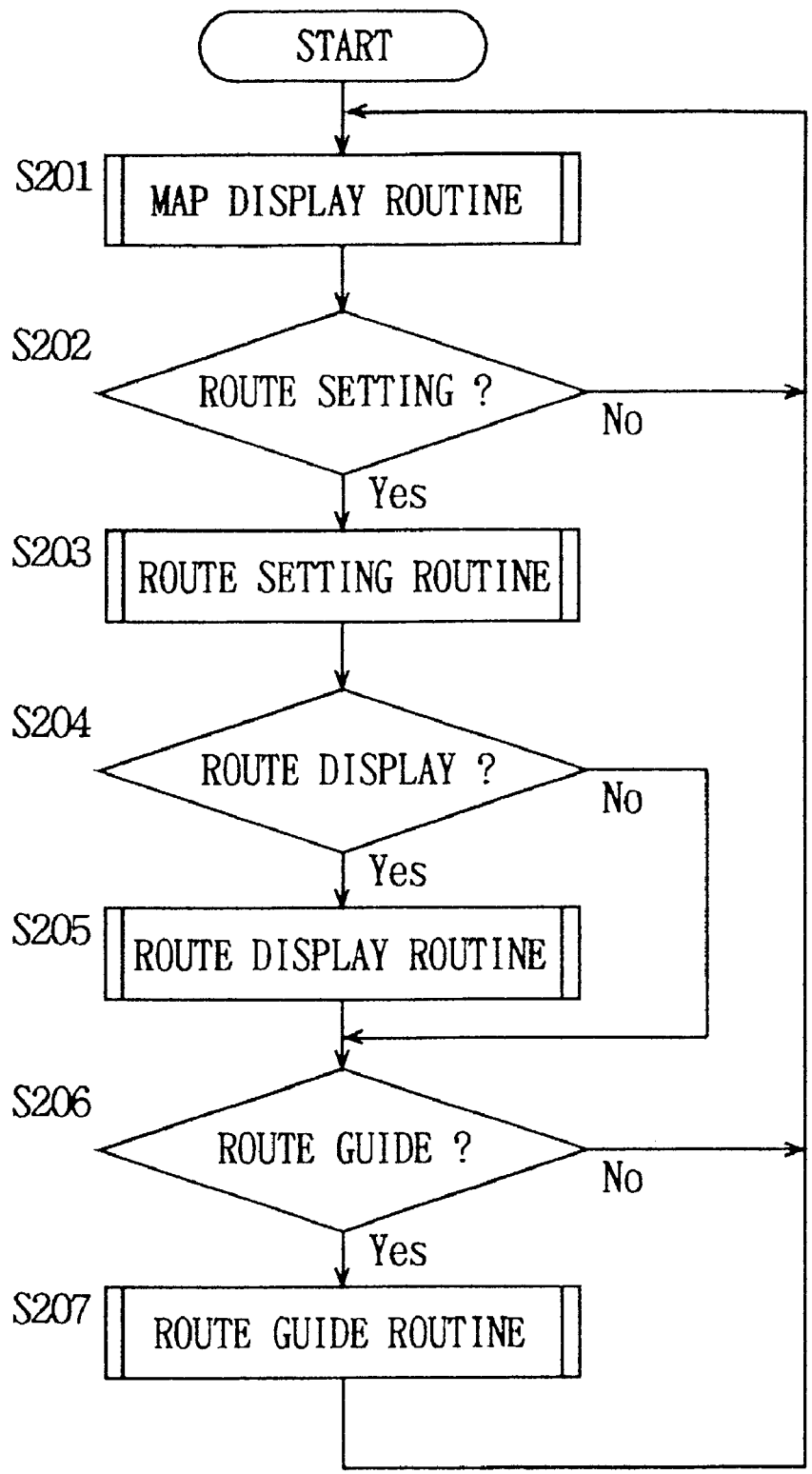
FIG. 9 is a flowchart showing the operation of a second embodiment of the present invention.
Figure 10:
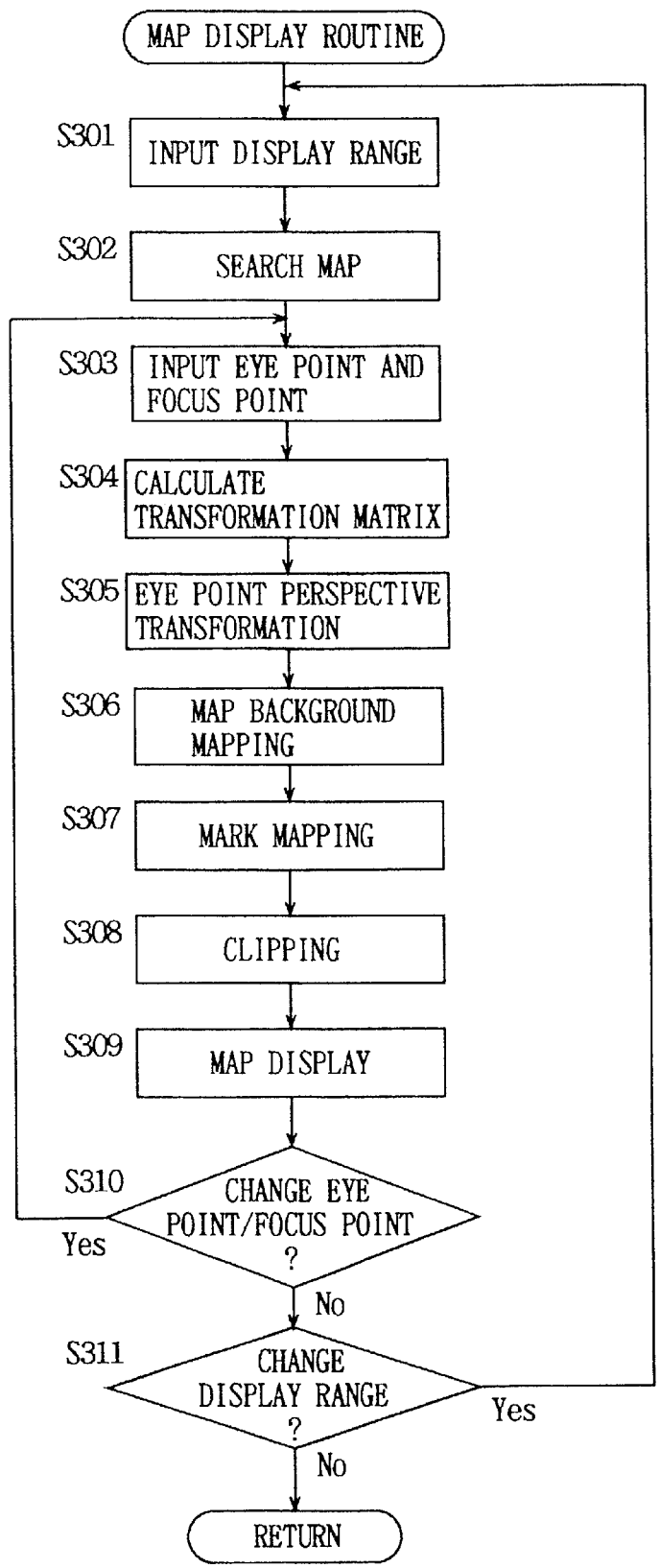
FIG. 10 is a flowchart showing a detailed map display routine in FIG. 9.

First, the processing unit 4 calls a map display routine (step S201 in FIG. 9). The processing procedure of the map display routine is shown in a flowchart in FIG. 10. The processings from steps S301 through S309 in FIG. 10 correspond to the processings from steps S101 through S109 in FIG. 2 of the first embodiment, respectively.

Next, the processing unit 4 determines whether a route is to be set (step S202 in FIG. 9). When the route is not to be set, the unit returns to step S201 to display the map. When the route is to be set, the unit goes to step S203 to call a route setting routine.

Figure 11:
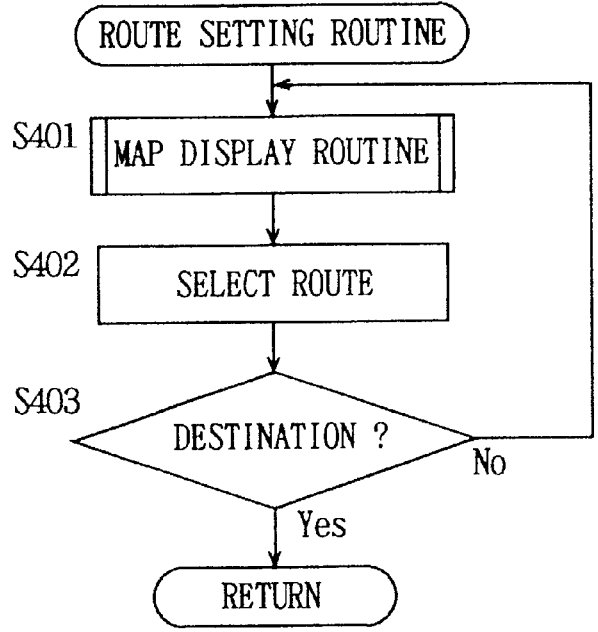
FIG. 11 is a flowchart showing a detailed route setting routine in FIG. 9.

FIG. 11 shows a processing procedure of the route setting routine. In the route setting routine, as the map is displayed being scrolled or rotated, the route is set from the starting point to the destination.

In the route setting routine of FIG. 11, the input unit 2 specifies a focus point position, and its adjacent maps are displayed on the output unit 7 (step S401). Next, a road adjacent to the focus point of the map is selected (step S402). The adjacent road normal to the focus point can be selected as the closest road. The processing is performed every time the focus point is updated, i.e., the map is scrolled, to allow to select a consecutive road. The starting point of the route is taken as a point first selected at step S402.

Next, the processing unit 4 judges whether the focus point reaches the destination by input from an operational switch (included in the input unit 2) (step S403). When the focus point has not reached the destination, the unit makes a transition to step S401. On the other hand, when the focus point is at the destination, the unit makes a transition to step S204 in FIG. 9 to determine whether the route set at step S203 is displayed. When the route is displayed, the unit goes to step S205 to call a route display routine. When the route is not displayed, the unit goes to step S206 to determine whether to perform a route guide.

Figure 12:
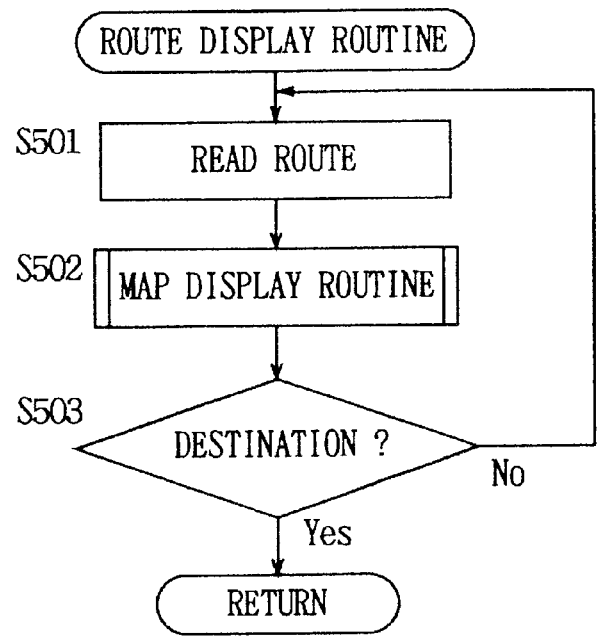
FIG. 12 is a flowchart showing a detailed route display routine in FIG. 9.

FIG. 12 shows a processing procedure of the route display routine. In the route display routine, as the route set at step S203 in FIG. 9 is traced from the starting point to the destination, the map is automatically scrolled or rotated to be provided for the operator.

The processing unit 4 first reads coordinates of the starting point of the route (step S501). Then, the processing unit 4 makes the output unit 7 display the three-dimensional map taking the starting point read at step S501 as the focus point (step S502). The processing unit 4 returns to step S501 to take a point advanced by a prescribed distance on the route, and again displays the map at step S502

The processing unit 4 repeats the processings at step S501 and S502 to provide the route from the starting point to the destination for the operator while automatically scrolling the map.

Next, at step S206, it is determined whether a route guide is performed according to the set route at step S203. When route guide is not performed, the unit returns to step S201 to display the map. When route guide is performed, on the other hand, the unit goes to step S207 to call a route guide routine.

Figure 13:
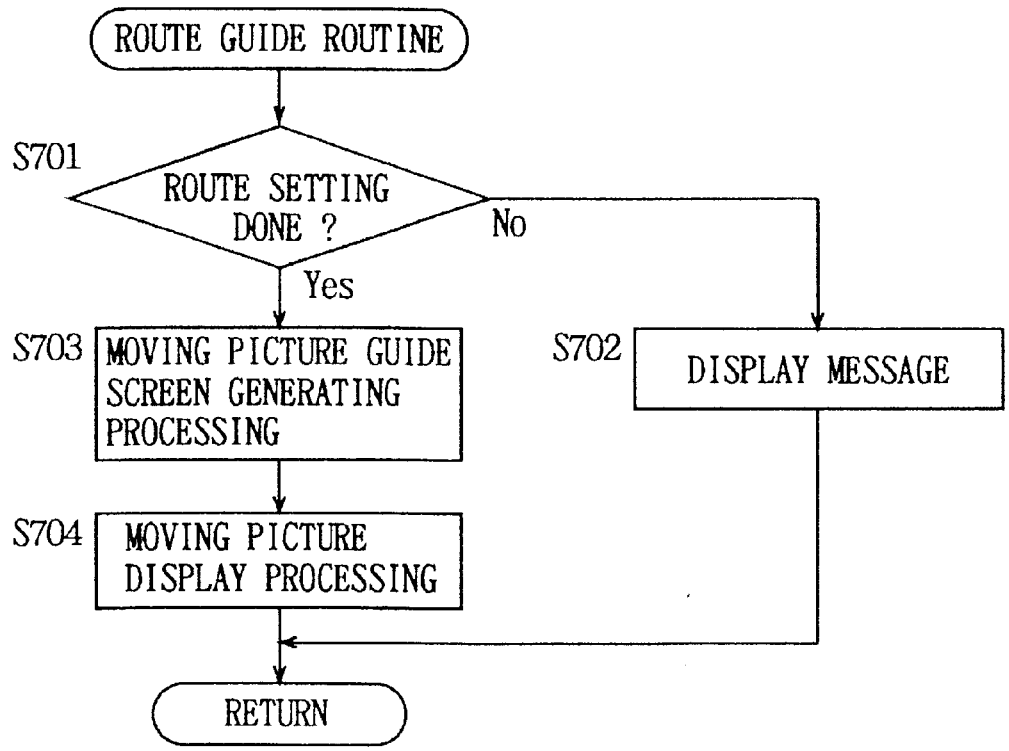
FIG. 13 is a flowchart showing a detailed route guide routine in FIG. 9.

FIG. 13 shows a processing procedure of the route guide routine. In the route guide routine, a route guide is performed for the operator according to the route set at step S203.

Figure 29:
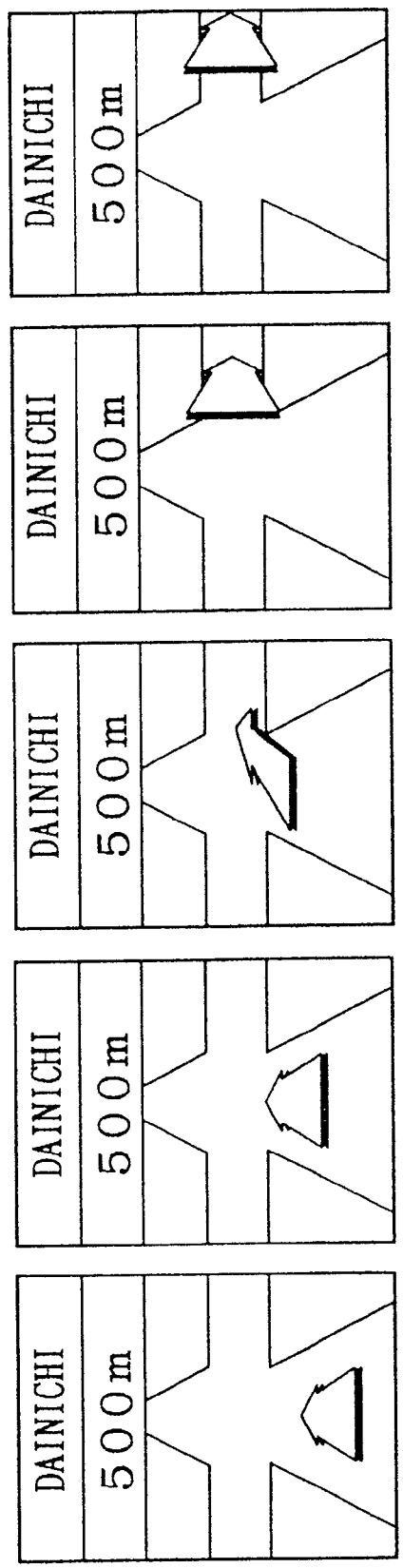
FIG. 29 is a diagram showing an example of moving picture data in use for a route guide.

At step S701, it is determined whether the route has been calculated. When the route has not been calculated, a message such as "No route set" is outputted at step S702. When the route has been calculated, at step S703, a moving picture guide screen forming processing is performed. The screen is formed by generating a moving picture by graphics such as an arrow on the enlarged intersection view displayed with a name of the intersection to be turned at and the distance to the intersection. FIG. 29 shows an example of the generated moving picture guide screen. Next, at step S704, the screen data generated at step S703 is displayed as a moving picture.

Through the above described processing operations, the operator operates the operation switch, feeling like as if he or she drove, to easily set the route from the starting point to the destination. Furthermore, according to the set route, the user can associate the real movement of the vehicle by displaying right-and-left turn information at the intersection using a moving picture, and easily grasp the direction of travel at the intersection.

In the second embodiment, while the focus point at the start of the processing is the starting point of the route, a processing of setting an arbitrary focus point as the starting point may be added.

In the route guide processing of the present invention, while the moving picture information is generated with respect to the intersection to be turned next, intersection information on an arbitrary route selected by the user may be generated by a moving picture.

In the route guide processing of the present invention, while the arrow in the guide direction on the enlarged intersection view is displayed as a moving picture, a state of a guide vehicle moving toward the guide direction may be displayed as a moving picture, instead of the arrow.

Information on the intersections on the whole forward route may be sequentially generated for display to provide the user with intersection images on the whole route.

Furthermore, in the second embodiment, during a three-dimensional map display processing, while the eye point is fixed above and behind the focus point, the eye point coordinates may be varied according to automatic or user's operation.

In the second embodiment, while the route from the starting point to the destination is set by tracing the road as the operator rotates and scrolls, the map may operate to display a map adjacent to the destination and set a destination mark on the displayed map, whereby the optimum route from the starting point to the destination may be automatically obtained by the Dijkstra method etc. For a method of setting the destination, the destination point may be automatically retrieved from a map database by a telephone number or a keyword.

In the second embodiment, the map from the starting point to the destination is automatically scrolled as the set route is traced, an overview of the route may be provided for the operator by linear scrolling from the starting point to the destination.

(3) Third embodiment

Next, an automotive navigation apparatus according to a third embodiment of the present invention is subsequently described. The basic structure of the automotive navigation apparatus of the third embodiment is the same as that of the first embodiment in FIG. 1. That is, in the third embodiment, a program stored in the ROM 3 of FIG. 1 is different from the program in the first embodiment. Therefore, the third embodiment is subsequently described referring to FIG. 1.

The third embodiment is mainly characterized in that the map unit is divided into fine blocks, altitude values are assigned to four vertexes of each fine block for the three-dimensional coordinate transformation, and the fine blocks are deformed to be mapped on the transformed coordinates, whereby a terrain are three-dimensionally displayed with a simple processing using only a plane map and altitude values.

Figure 15:
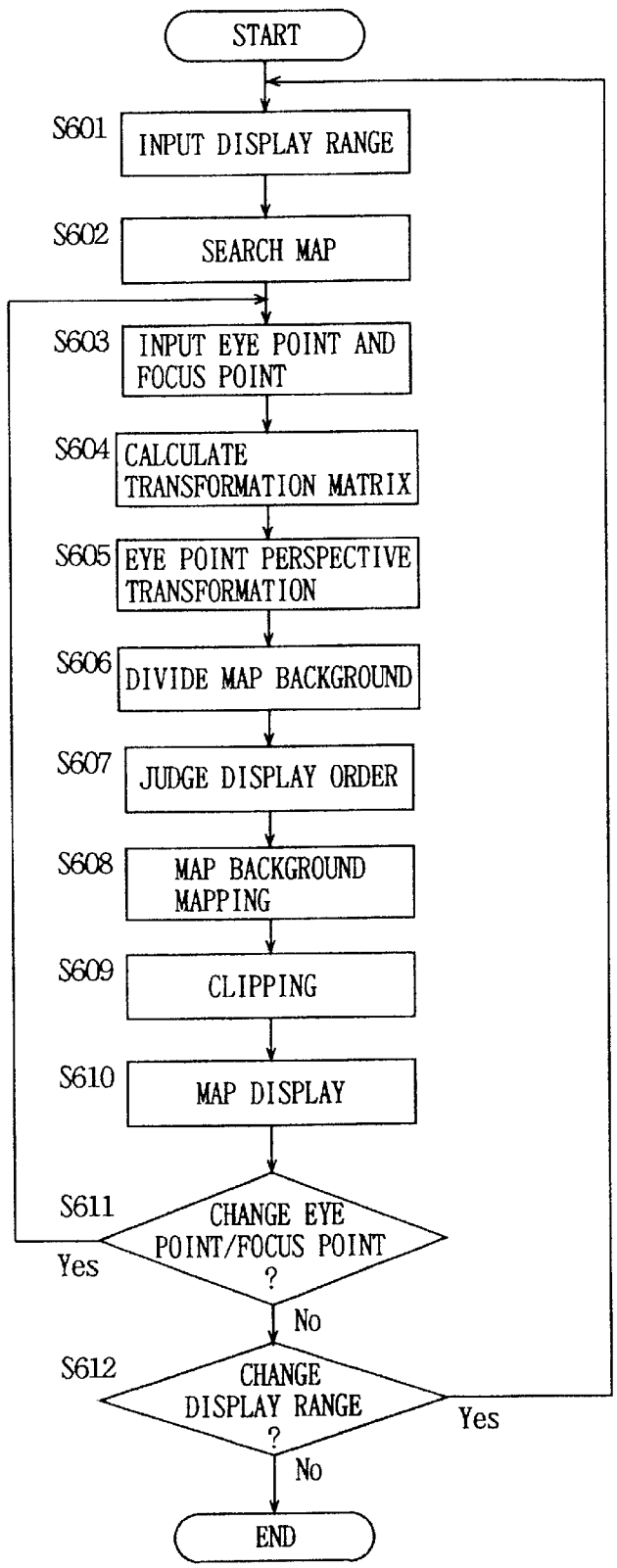
FIG. 15 is a flowchart showing the operation of a third embodiment of the present invention.

FIG. 15 is a flowchart describing a processing procedure in the third embodiment of the present invention. The content of the processing of the third embodiment is subsequently described referring to the flowchart.

The processing unit 4 inputs a range and scale of the map to be displayed on the basis of an operation by the operator through the input unit 2 or the current position of the vehicle obtained in the position calculator 1 (step S601).

Figure 16A:
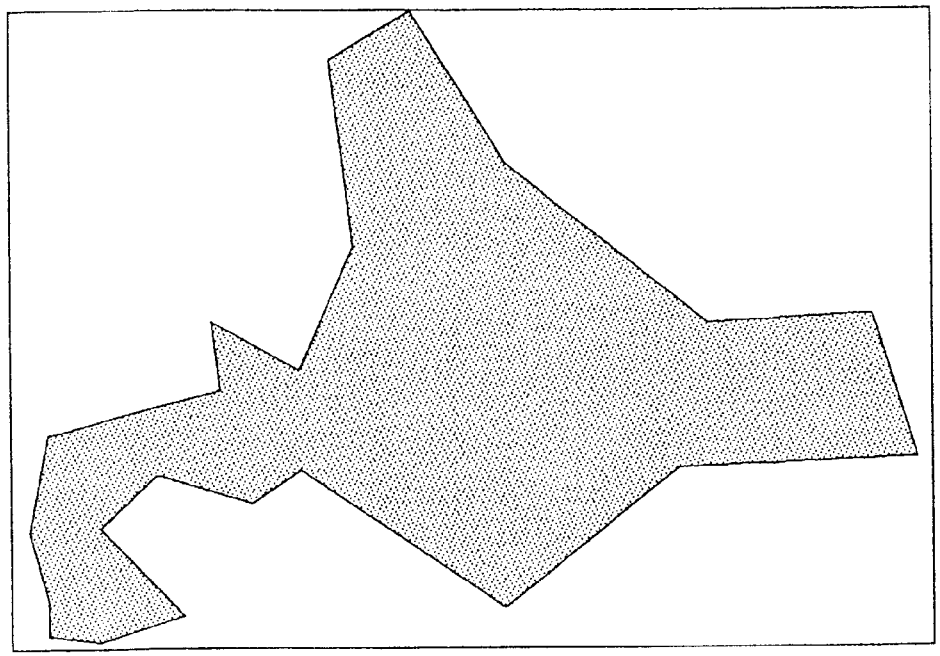
FIGS. 16(a) and 16(b) are diagrams showing a correspondence between the map unit and altitude value data.
Figure 16B:
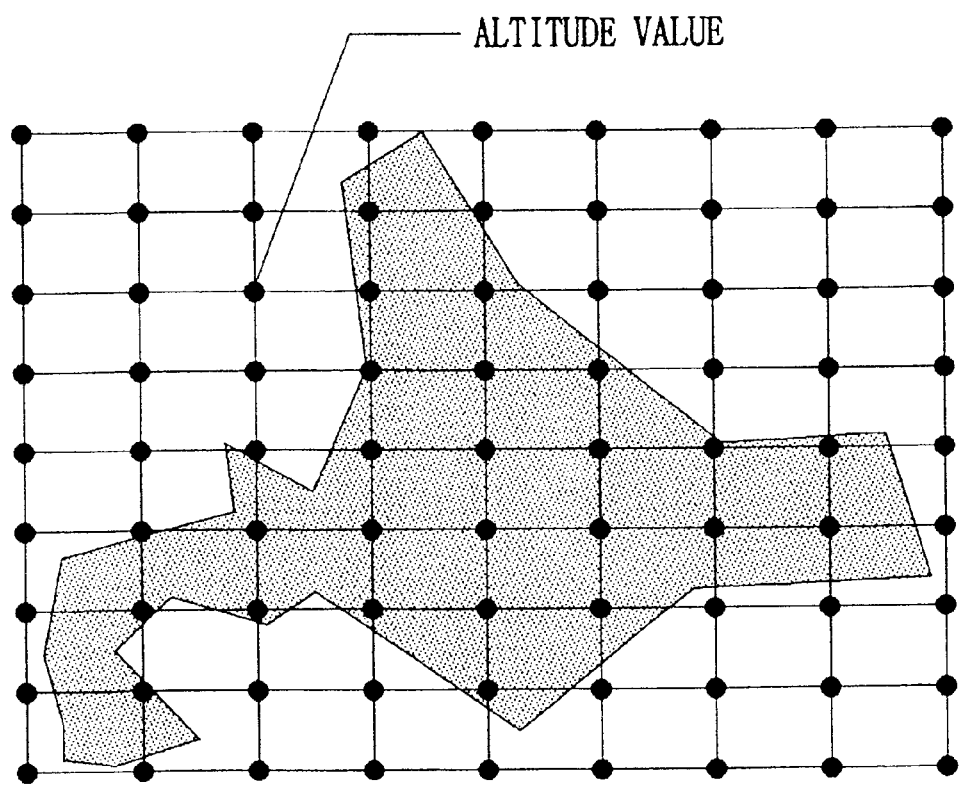
Figure 17A:
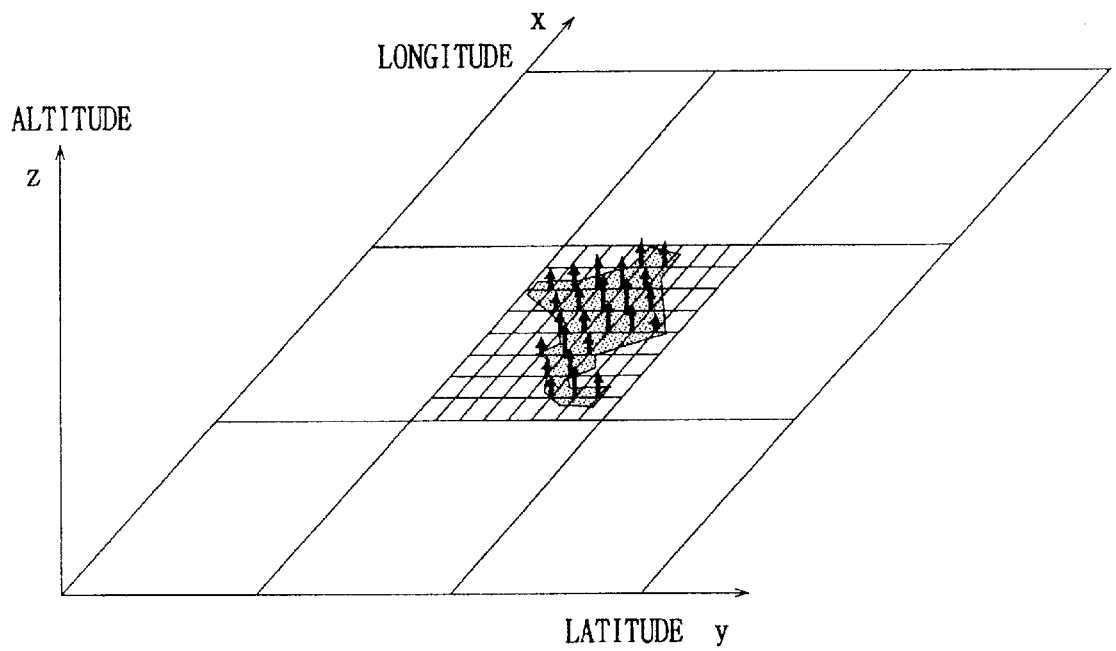
FIGS. 17(a) and 17(b) are diagrams showing a coordinate system of the map unit to which altitude values are assigned.
Figure 17B:
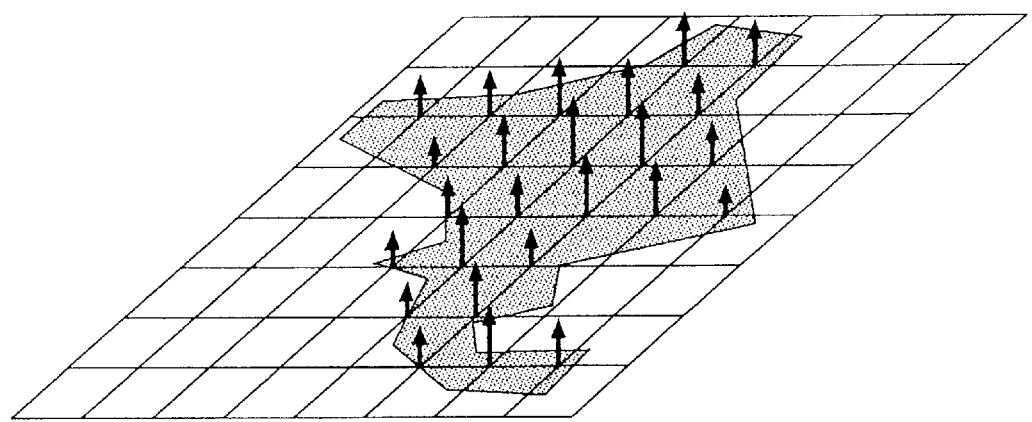

Next, the processing unit 4 searches a map corresponding to the scale and range decided at step S601 by using the map searching unit 6 to read the corresponding map data from the map storing unit 5 (step S602). As described in the first embodiment, the map data is divided into units by a prescribed range and is further formed of a plurality of layers (scales) which differ in a degree of details. Therefore, in order to display the map of an arbitrary range centering on an arbitrary point, the map unit including the center of display and eight adjacent map units thereof should be read in the corresponding scale. The read map unit is divided in eight in the latitude and longitude directions as shown in FIG. 16($b$), that is, divided in the total of 64 fine blocks. Next, altitude values are assigned to each vertex of the fine blocks obtained by division. These nine map units are then arranged as shown in FIG. 17($a$), where the upper left, the longitude direction, the latitude direction and the altitude value direction are taken as the origin, the x axis, the y axis and the z axis, respectively, and the vertexes of each fine block of each map unit are represented as P(x, y, z). FIG. 17($b$) shows the center map unit extracted from nine map units.

Figure 18:
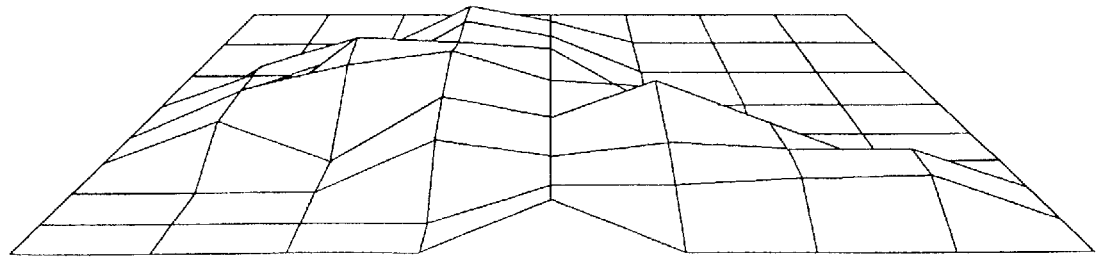
FIG. 18 is a diagram showing a result of a coordinate transformation of the map unit.

Next, the processing unit 4 inputs the eye point Pv(xv, yv, zv) and the focus point Pf(xf, yf, zf) (step S603). Next, the processing unit 4 calculates a transformation matrix from a world coordinate system to an eye point coordinate system as a determinant of the 3×3 matrix of the equation (1) (step S604). Next, the processing unit 4 transforms vertexes of each fine block of each map unit into eye point coordinates [x", y", z"] according to the equation (1) and performs the perspective transformation according to the equation (2) (step S605). In the equation (2), in [x', y'], the center of display is the origin of the coordinates. Furthermore, dist of the equation (2) designates a depth from the eye point and is set to the range of 300 to 1000 in the embodiment. FIG. 18 is a result of the above described coordinate transformation with respect to each fine block of the map unit in FIG. 17(*b*).

Figure 19:
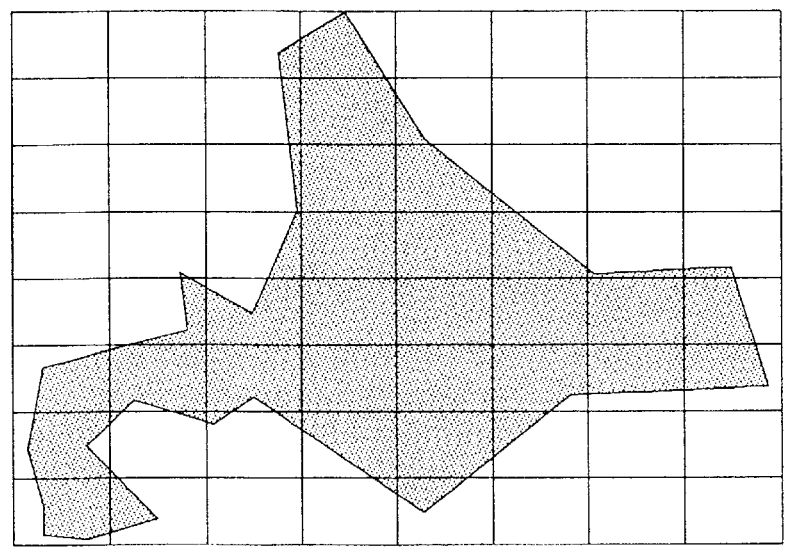
FIG. 19 is a diagram showing an example of a divided state of the map unit.

Next, the processing unit 4 divides a map background into 8×8 fine blocks shown in FIG. 19 (step S606). The fine blocks obtained by division are used for texture mapping at step S608 which is subsequently described.

Figure 21:
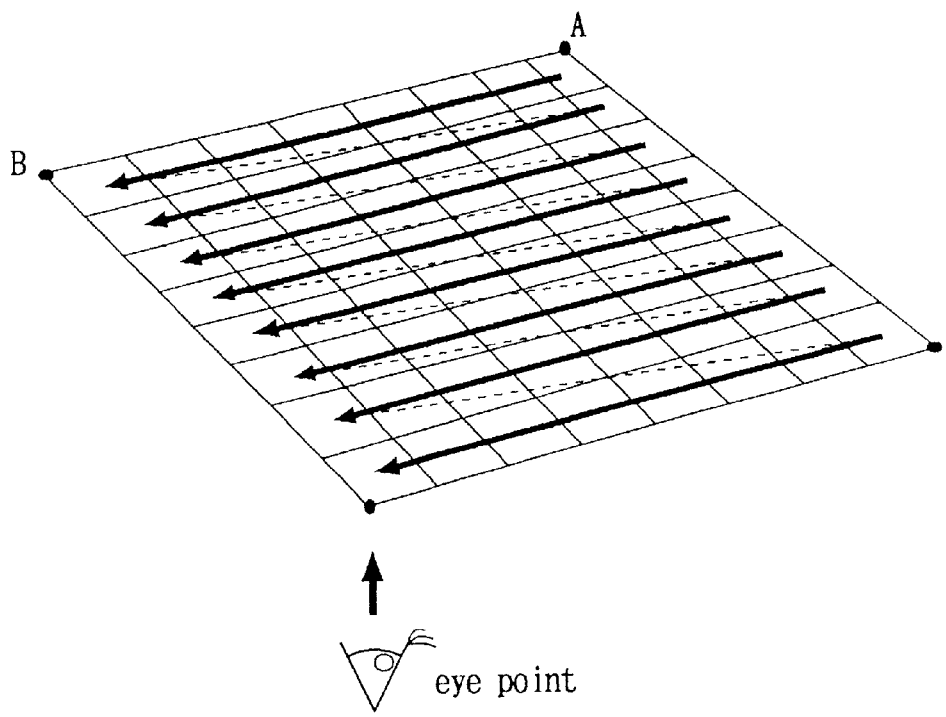
FIG. 21 is a diagram showing a concept of a simplified face hiding processing.

Next, the processing unit 4 judges the order for displaying the fine blocks obtained by division at step S606 (step S607). This is to perform a face hiding processing for hiding a face which cannot be seen from the set eye point position. The face hiding processing is generally realized by sorting all faces to be drawn in distant order from the eye point, the most distant first, and writing over the faces in the order from the most distant to the closest for display. In this method, however, as the number of the faces to be displayed increases so that the resolution of a three-dimensional figure increases, the time for sorting disadvantageously increases. Therefore, a simplified face hiding processing is used to decrease a load on a drawing processing. The simplified face hiding processing is subsequently descried in detail. First, as to the nine map units read at step S602, four vertexes which decide a read range are subjected to the eye point transformation. The four vertexes which decides the read range are four points of C1, C4, C13 and C16 when the nine read map units are arranged as in FIG. 4. In this situation, z coordinates of the four vertexes are set to 0. Next, the four vertexes subjected to the perspective transformation are sorted in the order from the eye point, the most distant first. After sorting, the most distant point from the eye point is A, and the second most distant point is B. Furthermore, as shown in FIG. 21, a scanning direction is decided from the point A to the point B. In drawing, the face hiding processing is performed by sequentially superposing each fine block in the scanning direction, as subsequently described.

Figure 20:
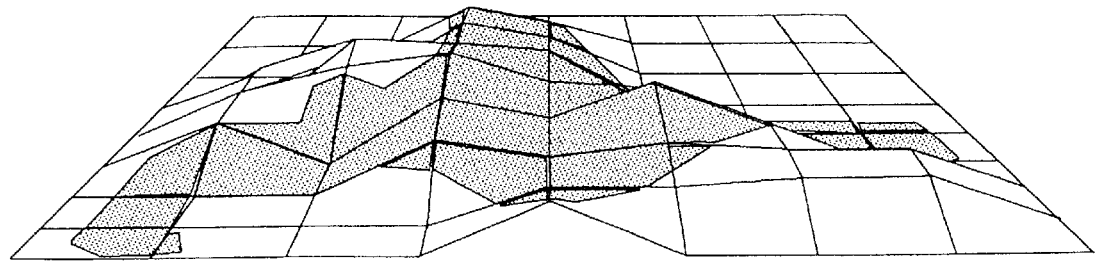
FIG. 20 is a diagram showing a result of mapping the map unit in FIG. 19 on FIG. 18.

Next, the processing unit 4 maps the fine blocks of the map background divided at step S606 in the order decided at step S607 (step S608). The fine blocks of the map background divided at step S606 are first deformed according to the coordinates subjected to the perspective transformation at step S605. Any method including linear interpolation can be used for deformation. Each of the deformed fine block is then sequentially superposed in the drawing order decided at step S607. FIG. 20 shows the result of mapping the map background divided into the fine blocks on the coordinates subjected to the perspective transformation on the basis of the altitude value data.

Next, the processing unit 4 clips the texture-mapped image as described above (step S609) and makes the output unit 7 display an area in a drawing window (step S610). Next, the processing unit 4 determines whether the eye point or the focus point is changed (step S611), and returns to step S603 to repeat the processings up to step S610 when the point is changed. On the other hand, when the eye point or the focus point is not changed, the processing unit 4 determines whether the display range is changed (step S612), and when the display range is changed, the unit returns to step S601 to repeat the processings up to step S610.

According to the third embodiment described above, a map display three-dimensionally representing terrain roughness can be performed with an easy processing using only the plane map and the altitude value data.

Figure 24:
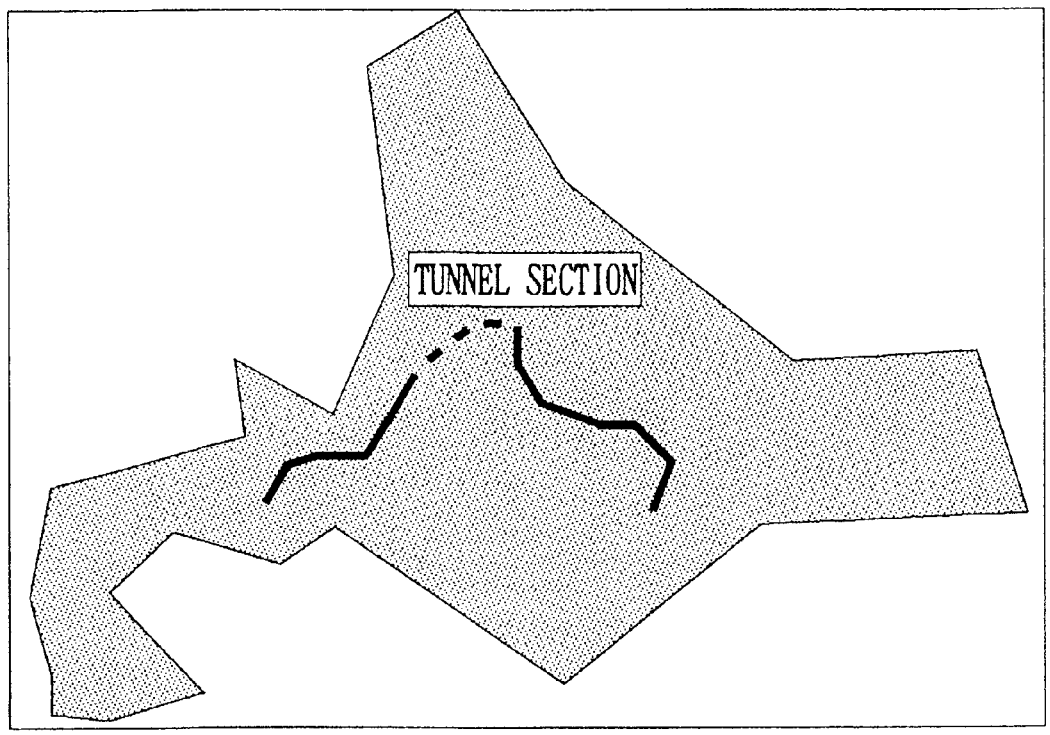
FIG. 24 is a diagram showing a display example of a tunnel section in the map unit.
Figure 25:
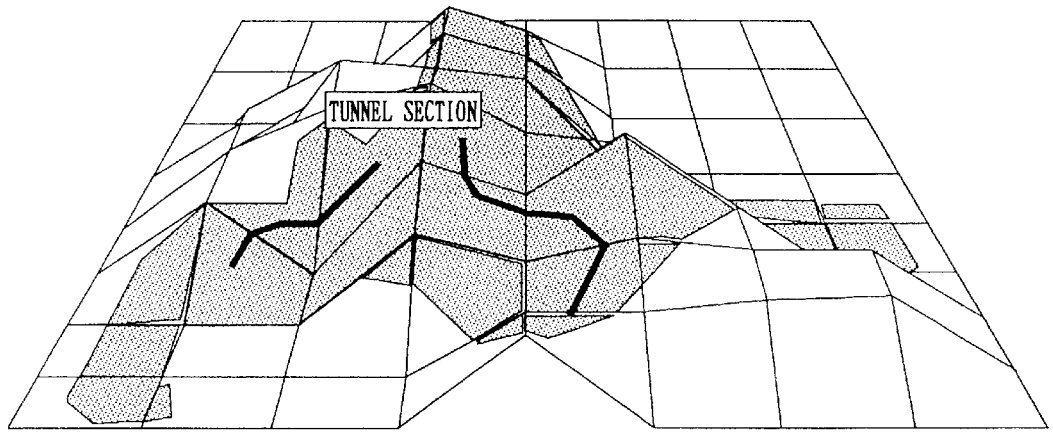
FIG. 25 is a diagram showing a result of mapping the map unit from which the tunnel section is deleted on FIG. 20.

A road, however, is generally represented with a solid line on map data, and a tunnel section in each road is generally represented with a broken line as shown in FIG. 24. When such map data is mapped as it is as a texture, a mountainous part which a tunnel is through is unnaturally represented such as that a broken line is displayed along ridges of mountains. Therefore, when such map background is mapped as a texture as at step S608, a section corresponding to the tunnel is extracted from a road network of each map unit for deletion, and then each unit is mapped. Specifically, when the map data is image data such as a bit map or an aerial photograph, the part with the broken line can be extracted by using an image processing method such as template matching. When the map data includes vector data such as a road classification and road connection information, the tunnel section can be directly extracted. The extracted tunnel section is deleted by a method such as pasting a background color. FIG. 25 shows the result of mapping the map background shown in FIG. 24 as a texture after the tunnel section is deleted.

Figure 22:
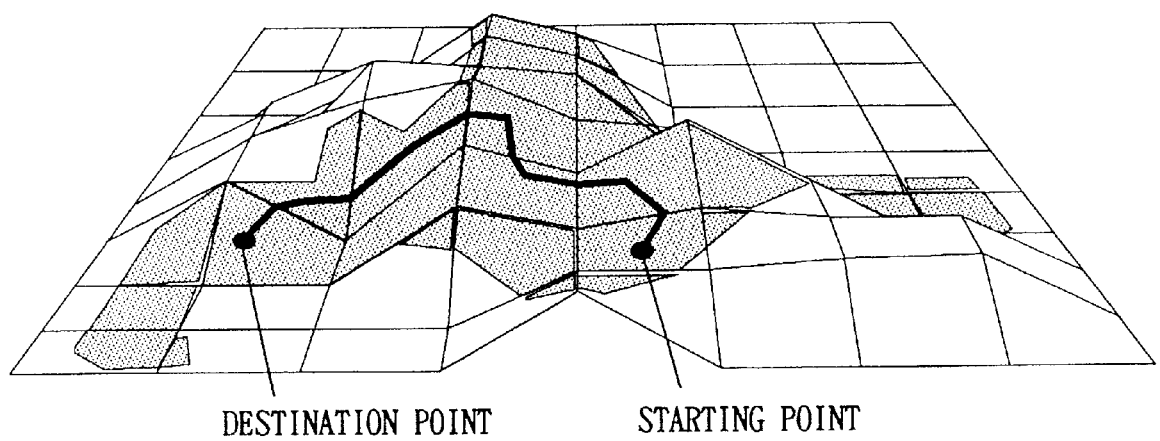
FIG. 22 is a diagram showing a result of displaying a route on FIG. 20.
Figure 23:
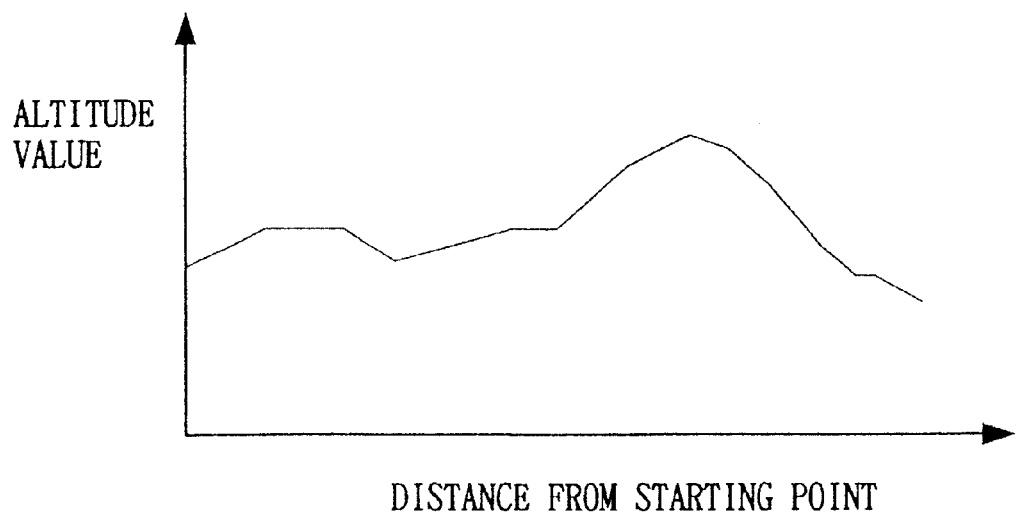
FIG. 23 is a diagram showing a cross-section of the altitude values.

Route setting from the starting point to the destination can be attained with the map being rotated or scrolled in a sense as if you drove on the map where the terrain is three-dimensionally displayed, by a method as shown in the second embodiment. Furthermore, when the route is set as described above, three-dimensional coordinates in the eye point coordinate system of dot strings forming each road are stored, and when all the route is finally determined, the route can be displayed on the map three-dimensionally displaying the terrain as shown in FIG. 22 by changing to display the color of the road and a line width as to the stored dot strings. At the same time, when a distance from the starting point in the set route is shown in the x axis and an altitude value is shown in the y axis, the cross sectional view of the route shown in FIG. 19 is displayed. This can be easily realized by developing the three-dimensional coordinates of the dot strings forming the route stored as described above on the two-dimensional coordinate system shown in FIG. 23.

Figure 26:
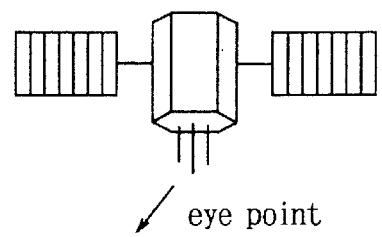
FIG. 26 is a diagram showing a concept of three-dimensional terrain display with a position of a GPS satellite as an eye point.
Figure 26:
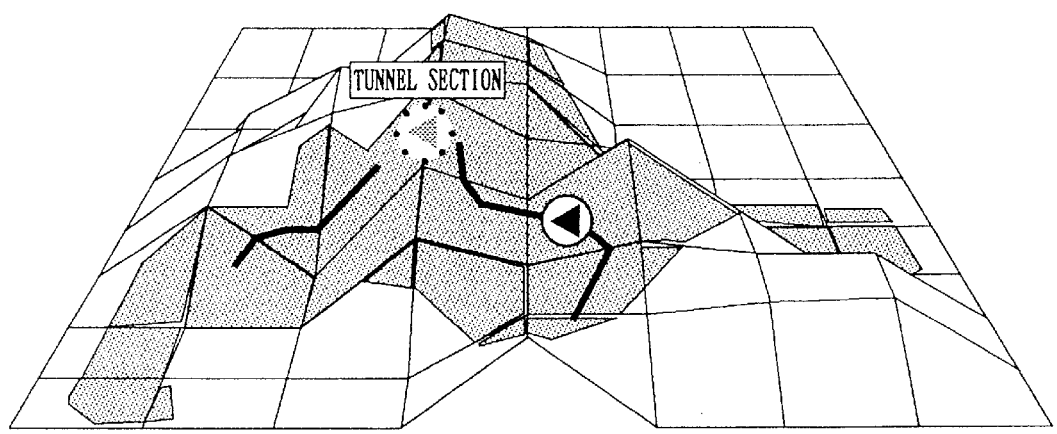

When a position of a GPS satellite is inputted as eye point coordinates, terrain display seen from the GPS satellite can be performed. Radio waves transmitted from the GPS satellite include two signals: an orbit signal representing the position of the satellite on the orbit and a signal representing time of day of signal transmission. Therefore, the position of the GPS satellite is detected from the orbit signal, and is inputted as eye point coordinates. At the same time, the calculated current position of the vehicle is inputted as focus point coordinates. In this situation, when the radio waves from the GPS cannot be received, a vehicle position detected by other sensors is inputted as the focus point coordinates. Based on the inputted eye point coordinates and the focus point coordinates, terrain display as described above is performed, and the current position of the vehicle is simultaneously displayed on the map. As a result, as shown in FIG. 26, when the vehicle position can be displayed on the map, that is, when the GPS satellite can look over the vehicle, a state can be determined as such that the radio waves from the GPS satellite can be easily received. On the other hand, when the vehicle position is displayed on the tunnel section or cannot be displayed behind a recess of a mountain, that is, when the GPS satellite cannot look over the vehicle, it can be determined that a receiving state of the radio waves from the GPS satellite is not good. In this way, the terrain is three-dimensionally displayed with the position of the GPS satellite as an eye point and simultaneously the vehicle position is displayed on the map, whereby the receiving state of the radio waves from the GPS satellite can be visually provided for a driver.

When the scale of the map is small, a range which the map covers is large. Thus, in three-dimensional display, the change of terrain roughness of mountains and valleys is represented to allow map display with reality. On the other hand, when the scale of the map is large, a range which the map covers is small. Thus, an effect of three-dimensional display of the terrain roughness is small and the map visibility becomes even worse in the mountainous part, Therefore, the scale of the altitude value data used for coordinate transformation may be variable between layers of the displayed map and the terrain roughness may be adjusted accordingly.

In the third embodiment, while one map unit is divided into 8×8 blocks and altitude values are assigned to each vertex of the 64 blocks, the number of division may be set according to resolution of the available altitude value data.

Furthermore, in the third embodiment, while the map data is mapped as a texture, image data such as an aerial photograph may be used.

While the invention has been described in detail, the foregoing description is in all aspects illustrative and not restrictive. It is understood that numerous other modifications and variations can be devised without departing from the scope of the invention.

What is claimed is:

1. An automotive navigation system comprising:

map storing means for storing map data;

map acquiring means for acquiring the map data stored in said map storing means;

eye point inputting means for inputting into said automotive navigation system eye point coordinates and focus point coordinates according to which the map data acquired by said map acquiring means are to be viewed;

coordinate transforming means for performing a three-dimensional coordinate transformation of a specific point on the map data acquired by said map acquiring means on the basis of the eye point coordinates and the focus point coordinates inputted by said eye point inputting means;

mapping means for deforming the map data acquired by said map acquiring means so as to map the map data with respect to coordinates transformed by said coordinate transforming means;

clipping means for clipping the map data mapped by said mapping means; and output means for outputting a map having an area corresponding to the map data clipped by said clipping means.

2. The automotive navigation apparatus according to claim 1, wherein said coordinate transforming means is operable for performing the three-dimensional coordinate transformation of the specific point on the map data acquired by said map acquiring means on the basis of the eye point coordinates and the focus point coordinates inputted by said eye point inputting means and the three-dimensional coordinate transformation of reference point coordinates of a prescribed mark included in said map data, and is further operable for correcting a shift between a map background and said reference point coordinates after the transformation; and said output means is operable for superposing and displaying the prescribed mark subjected to coordinate correction on the map.

3. The automotive navigation apparatus according to claim 1, wherein said output means is operable for changing an output size of the prescribed mark on the basis of a relative positional relationship between a focus point position inputted by said eye point inputting means and the reference point coordinates of said prescribed mark.

4. The automotive navigation apparatus according to claim 1, wherein said output means is operable for changing an output shape pattern of the prescribed mark on the basis of a relative positional relationship between a focus point position inputted by said eye point inputting means and the reference point coordinates of said prescribed mark.

5. The automotive navigation apparatus according to claim 1, wherein said coordinate transforming means is operable for performing the three-dimensional coordinate transformation of the map data acquired by said map acquiring means on the basis of the eye point coordinates and the focus point coordinates inputted by said eye point inputting means and the three-dimensional coordinate transformation of a three-dimensional shape mark included in said map data.

6. The automotive navigation apparatus according to claim 1, further comprising route setting means for obtaining a route between arbitrary positions.

7. The automotive navigation apparatus according to claim 1, further comprising traffic information displaying means for receiving traffic information and for superimposing and three-dimensionally displaying the traffic information on the map.

8. The automotive navigation apparatus according to claim 1, further comprising position calculating means for detecting a current position of a vehicle, wherein said output means is operable for superimposing and displaying a position of the vehicle detected by said position calculating means on the map.

9. The automotive navigation apparatus according to claim 1, further comprising:

altitude value storing means for storing altitude value data;

altitude value acquiring means for acquiring the altitude value data corresponding to the map data acquired by said map acquiring means from said altitude value storing means; and map dividing means for dividing the map data acquired by said map acquiring means into fine blocks;

wherein said coordinate transforming means is operable for performing the three-dimensional coordinate transformation using the altitude value data acquired by said altitude value acquiring means, and said mapping means is operable for deforming the fine blocks obtained by division by said map dividing means so as to map the fine blocks with respect to the coordinates transformed by said coordinate transforming means; and further comprising face hiding processing means for performing a face hiding processing on the fine blocks mapped by said mapping means.

10. The automotive navigation apparatus according to claim 9, further comprising position calculating means for detecting a current position of a vehicle, wherein said output means is operable for superimposing and displaying a position of the vehicle detected by said position calculating means on the map.

11. The automotive navigation apparatus according to claim 10, wherein said position calculating means is further operable for detecting the position of the vehicle by receiving radio waves from a GPS satellite, and said eye point inputting means is operable for obtaining coordinates of the GPS satellite received by said position calculating means as the eye point coordinates.

12. The automotive navigation apparatus according to claim 9, wherein said face hiding processing means is operable for writing over each of the fine blocks obtained by division by said map dividing means while scanning in a prescribed direction.

13. The automotive navigation apparatus according to claim 12, wherein said face hiding processing means is operable for scanning so as to output said map data subjected to the coordinate transformation from a most distant point to a second most distant point with respect to an eye point inputted by said eye point inputting means among four vertexes of the map data acquired by said map acquiring means which are subjected to an eye point transformation by said coordinate transforming means.

14. The automotive navigation apparatus according to claim 9, further comprising:

route setting means for obtaining a route between arbitrary points; and cross-sectional view displaying means for outputting altitude values on the route set by said route setting means as a cross-sectional view.

15. The automotive navigation apparatus according to claim 9, wherein said mapping means is operable for recognizing a tunnel section on the map data acquired by said map acquiring means, and is further operable for deleting the tunnel section for mapping.

16. The automotive navigation apparatus according to claim 9, wherein said coordinate transforming means is operable for performing the coordinate transformation while changing a scale of the altitude values acquired by said altitude value acquiring means on the basis of a layer of the map data acquired by said map acquiring means or an eye point position inputted by said eye point inputting means.

17. The automotive navigation apparatus according to claim 1, wherein said mapping means deforms the map data by performing linear interpolation.

18. The automotive navigation apparatus according to claim 1, wherein said mapping means deforms an entire display content of the map data such that an eye point perspective transformation is applied to the entire display content of the map data.

19. The automotive navigation apparatus according to claim 1, further comprising:

mark mapping means for mapping a mark onto the map data so as to mark a position of an object on the map; and coordinate correction means for correcting a difference between coordinates transformed by said coordinate transforming means and corresponding map data deformed by said mapping means such that a display position of the mark is consistent with the position of the object on the map.

20. An automotive navigation apparatus which is loaded in a vehicle for guiding and instructing a route of the vehicle and for generating an output map, said apparatus comprising:

map storing means for storing map data;

position calculating means for calculating a current position of the vehicle;

scroll instructing means for instructing the output map to be scrolled;

reference position deciding means for deciding a reference position of the output map using one of the current position of the vehicle calculated by said position calculating means and a position specified by said scroll instructing means as a reference;

output range specifying means for specifying an output range of the map;

mark generating means for generating a current position mark and a current position indicating mark showing a positional relationship of the current position mark with respect to the reference position on the basis of the current position of the vehicle calculated by said position calculating means and the reference position of the output map decided by said reference position deciding means;

output screen generating means for reading a corresponding range of the map data from said map storing means on the basis of the reference position of the output map decided by said reference position deciding means and the output range of the map specified by said output range specifying means, and for generating an output screen together with the current position mark and the current position indicating mark generated by said mark generating means; and output means for outputting the output screen generated by said output screen generating means.

21. An automotive navigation apparatus which is loaded in a vehicle for guiding and instructing a route of the vehicle and for generating an output map, said apparatus comprising:

map storing means for storing map data;

position calculating means for calculating a current position of the vehicle;

scroll instructing means for instructing the output map to be scrolled;

reference position deciding means for deciding a reference position of the output map using the current position of the vehicle calculated by said position calculating means as a reference;

output range specifying means for specifying an output range of the map;

mark generating means for generating a current position mark on the basis of the current position of the vehicle calculated by said position calculating means;

route searching means for reading necessary map data from said map storing means to calculate a route between two points;

moving picture guide screen generating means for generating a moving picture guide screen for a route guide on the basis of the route calculated by said route searching means;

output screen generating means for reading a corresponding range of the map data from said map storing means on the basis of the reference position of the output map decided by said reference position deciding means and the output range of the map specified by said output range specifying means, and for generating an output screen together with the current position mark generated by said mark generating means and the moving picture guide screen generated by said moving picture guide screen generating means; and output means for outputting the output screen generated by said output screen generating means.

22. A recording medium for use with a map data storing device which previously stores map data, said recording medium operable for storing a software program for executing on a computer a method comprising:

acquiring map data from the map data storing device;

inputting eye point coordinates and focus point coordinates from which the map data acquired by said acquiring is to be viewed;

performing a three-dimensional coordinate transformation of a specific point on the map data acquired by said acquiring on the basis of the eye point coordinates and the focus point coordinates inputted by said inputting;

deforming the map data acquired by said acquiring so as to map the map data with respect to the coordinates transformed by said performing of the three-dimensional transformation;

clipping the map data mapped by said deforming; and outputting a map area clipped by said clipping.

23. The recording medium according to claim 22 for further use with altitude value storing device which previously stores altitude value data, wherein said method executed by said software program on said recording medium further comprises:

acquiring altitude value data corresponding to the map data acquired by acquiring of map data from the altitude value storing device;

dividing the map data into fine blocks;

performing the three-dimensional coordinate transformation using the altitude value data;

deforming the fine blocks obtained by said dividing so as to map the fine blocks onto the coordinates transformed by said performing of the three-dimensional transformation; and performing a face hiding processing on the fine blocks mapped by deforming of the fine blocks.

24. A computer program embodied on computer readable medium for use with a computer and a memory for storing map data, said computer program comprising:

map data acquiring program code means for causing the computer to acquire map data from the memory;

coordinate inputting program code means for causing the computer to acquire eye point coordinates and focus point coordinates from which the map data is to be viewed;

coordinate transformation program code means for causing the computer to perform a three-dimensional coordinate transformation of a specific point on the map data on the basis of the eye point coordinates and the focus point coordinates so as to produce corresponding transformed coordinates;

data deforming program code means for causing the computer to deform the map data so as to map the map data with respect to the transformed coordinates;

clipping program code means for causing the computer to clip the map data mapped onto the transformed coordinates so as to produce map area data; and outputting program code means for causing the computer to output a map corresponding to the map area data.

25. A computer program embodied on a computer readable medium as claimed in claim 24, wherein the memory includes altitude value data stored therein, said computer program further comprising:

altitude value data acquiring program code means for causing the computer to acquire altitude value data from the memory corresponding to the map data; and dividing program code means for causing the computer to divide the map data into fine blocks;

wherein said coordinate transformation program code means is further operable for causing the computer to perform the three-dimensional coordinate transformation using the altitude value data so as to produce the corresponding transformed coordinates and said data deforming program code means is further operable for causing the computer to deform the fine blocks so as to map the fine blocks with respect to the transformed coordinates;

wherein said computer program further comprises a face hiding program code means for causing the computer to perform a face hiding processing on the fine blocks.

* * * * *